(12) United States Patent
Raleigh et al.

(10) Patent No.: US 10,114,810 B2
(45) Date of Patent: Oct. 30, 2018

(54) METHODS AND A COMPUTING DEVICE FOR MAINTAINING COMMENTS AND GRAPHICAL ANNOTATIONS FOR A DOCUMENT

(71) Applicant: WORKIVA INC., Ames, IA (US)

(72) Inventors: Nathan Raleigh, Parker, CO (US); Todd Kaji, Littleton, CO (US); Brandon Carpenter, Highlands Ranch, CO (US); Shane Sawyer, Centennial, CO (US); Jason Moore, Bozeman, MT (US)

(73) Assignee: Workiva Inc., Ames, IA (US)

( * ) Notice: Subject to any disclaimer, the term of this patent is extended or adjusted under 35 U.S.C. 154(b) by 5 days.

(21) Appl. No.: 15/725,973

(22) Filed: Oct. 5, 2017

(65) Prior Publication Data

US 2018/0032493 A1 Feb. 1, 2018

Related U.S. Application Data

(63) Continuation-in-part of application No. 14/817,444, filed on Aug. 4, 2015.

(60) Provisional application No. 62/086,178, filed on Dec. 1, 2014.

(51) Int. Cl.

| G06F 17/00 | (2006.01) |
|---|---|
| G06F 17/24 | (2006.01) |
| G06Q 10/10 | (2012.01) |
| G06F 17/21 | (2006.01) |
| G06F 17/22 | (2006.01) |

(52) U.S. Cl.
CPC .......... *G06F 17/241* (2013.01); *G06F 17/212* (2013.01); *G06F 17/2235* (2013.01); *G06Q 10/101* (2013.01)

(58) Field of Classification Search
CPC ............. G06F 17/30312; G06F 17/241; G06F 17/30882; G06F 17/212; G06F 17/2235; G06Q 10/101
USPC .......................................................... 715/230
See application file for complete search history.

(56) References Cited

U.S. PATENT DOCUMENTS

| 5,146,552 A | 9/1992 | Cassorla et al. |
|---|---|---|
| 6,279,014 B1 | 8/2001 | Schilit et al. |
| 6,438,566 B1 | 8/2002 | Okuno et al. |
| 6,687,878 B1 | 2/2004 | Eintracht et al. |

(Continued)

OTHER PUBLICATIONS

GOOD.iWARE, "GoodReader User Manual," <http://www.goodware.com/gr-man-view-pdf.html>, 2014, 12 pages.

(Continued)

*Primary Examiner* — Scott T Baderman
*Assistant Examiner* — Jason T Edwards
(74) *Attorney, Agent, or Firm* — Drinker Biddle & Reath LLP

(57) ABSTRACT

In various implementations, a first computing device (such as a cloud-based server) receives, from a second computing device (e.g., a notebook computer, tablet computer, or smartphone): (a) a graphical annotation for a document displayed on the second computing device, and (b) a comment for the graphical annotation. The first computing device stores the graphical annotation in a database in a graphical annotation data entity, stores the comment in the database in a comment data entity, and associates the graphical annotation data entity with the comment data entity within the database.

16 Claims, 23 Drawing Sheets

(56) References Cited

U.S. PATENT DOCUMENTS

| | | | |
|---|---|---|---|
| 7,010,751 B2 | 3/2006 | Shneiderman | |
| 7,028,267 B1 | 4/2006 | Beezer et al. | |
| 7,366,979 B2 | 4/2008 | Spielberg et al. | |
| 7,373,590 B2 | 5/2008 | Woolf et al. | |
| 7,950,064 B2 | 5/2011 | Chavez et al. | |
| 7,975,222 B1 | 7/2011 | Chegini et al. | |
| 8,453,052 B1 | 5/2013 | Newman et al. | |
| 8,495,489 B1* | 7/2013 | Everingham | G06Q 50/01 707/621 |
| 8,504,827 B1 | 8/2013 | Sizer et al. | |
| 8,522,130 B1 | 8/2013 | Gilead et al. | |
| 8,527,868 B2 | 9/2013 | Harter, Jr. | |
| 8,533,238 B2 | 9/2013 | Yu et al. | |
| 8,640,023 B1* | 1/2014 | Murray | G06F 17/30873 715/230 |
| 9,430,141 B1* | 8/2016 | Lu | G06F 17/241 |
| 2004/0210833 A1* | 10/2004 | Lerner | G06F 3/04883 715/201 |
| 2005/0198202 A1* | 9/2005 | Yamamoto | G06F 17/2247 709/218 |
| 2005/0262051 A1* | 11/2005 | Dettinger | G06F 17/30525 |
| 2006/0053364 A1* | 3/2006 | Hollander | G06F 17/241 715/232 |
| 2007/0208994 A1 | 9/2007 | Reddel et al. | |
| 2007/0239828 A1* | 10/2007 | Patton | G06Q 10/10 709/204 |
| 2008/0005064 A1 | 1/2008 | Sarukkai | |
| 2008/0028301 A1 | 1/2008 | Look et al. | |
| 2010/0011282 A1* | 1/2010 | Dollard | G06F 17/241 715/233 |
| 2010/0318893 A1 | 12/2010 | Matthews et al. | |
| 2011/0022942 A1 | 1/2011 | Flemings et al. | |
| 2011/0154180 A1 | 6/2011 | Evanitsky et al. | |
| 2012/0036423 A1* | 2/2012 | Haynes, II | G06Q 30/0201 715/230 |
| 2012/0060082 A1* | 3/2012 | Edala | G06F 17/241 715/231 |
| 2014/0325333 A1* | 10/2014 | Evans | H04N 21/23109 715/230 |
| 2015/0220504 A1 | 8/2015 | Bocanegra Alvarez et al. | |
| 2015/0268835 A1* | 9/2015 | Hirano | G06F 3/04842 715/751 |
| 2015/0296027 A1* | 10/2015 | Bak | H04L 67/148 709/202 |
| 2016/0070688 A1 | 3/2016 | Yao et al. | |

OTHER PUBLICATIONS

PLOTSOFT LLC, "New PDF Comment 4: Sticky Note Tool," <http://www.pdfill.com/pdf_comment_stickynote.html>, 2014, 3 pages.

* cited by examiner

2013 BOARD REPORT
Company Letter

Fellow Directors:

Lorem ipsum dolor sit amet, consectetuer adipiscing elit. Aenean commodo ligula eget dolor. Aenean massa. Cum sociis natoque penatibus et magnis dis parturient montes nascetur ridiculus mus. Donec quam felis, ultricies nec, pellentesque eu, pretium quis, sem. Nulla consequat massa quis enim. Donec pede justo, fringilla vel, aliquet nec, vulputate eget, arcu. In enim justo, rhoncus ut, imperdiet a, venenatis vitae, justo. Nullam dictum felis eu pede mollis pretium. Integer tincidunt. Cras dapibus. Vivamus elementum semper nisi. Aenean vulputate eleifend tellus. Aenean leo ligula, porttitor eu, consequat vitae, eleifend ac, enim. Aliquam lorem ante, dapibus in, viverra quis, feugiat a, tellus. Phasellus viverra nulla ut metus varius laoreet.

458

👤 First User    just now ▼
I don't know about this last term.

484

Reply to this comment....

rhoncus. Maecenas tempus, tellus eget condimentum rhoncus, sem quam semper libero, sit amet adipiscing sem neque sed ipsum. Nam quam nunc, blandit vel, luctus pulvinar, hendrerit id, lorem. Maecenas nec odio et ante tincidunt tempus. Donec vitae sapien ut libero venenatis faucibus. Nullam quis ante. Etiam sit amet orci eget eros faucibus tincidunt. Duis leo. Sed fringilla mauris sit amet nibh. Donec sodales sagittis magna. Sed consequat, leo eget bibendum sodales, augue velit cursus nunc.

2013 BOARD REPORT
Company Letter

Fellow Directors:

Lorem ipsum dolor sit amet, consectetuer adipiscing elit. Aenean commodo ligula eget dolor. Aenean massa. Cum sociis natoque penatibus et magnis dis parturient montes nascetur ridiculus mus. Donec quam felis, ultricies nec, pellentesque eu, pretium quis, sem. Nulla consequat massa quis enim. Donec pede justo, fringilla vel, aliquet nec, vulputate eget, arcu. In enim justo, rhoncus ut, imperdiet a, venenatis vitae, justo. Nullam dictum felis eu pede mollis pretium. Integer tincidunt. Cras dapibus. Vivamus elementum semper nisi. Aenean vulputate eleifend tellus. Aenean leo ligula, porttitor eu, consequat vitae, eleifend ac, enim. Aliquam lorem ante, dapibus in, viverra quis, feugiat a, tellus. Phasellus viverra nulla ut metus varius laor_486 rhoncus. Maecenas tempus, tellus eget condimentum rhoncus, sem quam semper libero, sit amet adipiscing sem neque sed ipsum. Nam quam nunc, blandit vel, luctus pulvinar, hendrerit id, lorem. Maecenas nec odio et ante tincidunt tempus. Donec vitae sapien ut libero venenatis faucibus. Nullam quis ante. Etiam sit amet orci eget eros faucibus tincidunt. Duis leo. Sed fringilla mauris sit amet nibh. Donec sodales sagittis magna. Sed consequat, leo eget bibendum sodales, augue velit cursus nunc.

Toolbar: Select, Rectangle, Oval, Call-Out, Line, Arrow, Text, Approve, Tickmarks▾, Color▾, Font▾, Size▾, Weight▾, Hide Exhibit 1 copy ▾

Pages: Page 1, Page 2

Annotations:
- ☐ Exhibit Number
- ✓ Foot
- ✗ CrossFoot

Legend box (604): Exhibit Number / Exhibit Number

Annotation (610): John Smith — Yesterday 11:20 AM — "Need to verify this"

| Exhibit Number | Exhibit Description | Incorporated by Reference** Form | Date |
|---|---|---|---|
| 3.3 *606* | Certificate of Correction | 10-Q | 4/11/03 |
| 3.3 | Certificate of Designation | 10-Q | 7/8/03 |
| 4.1 | Fourth Amended and Rest | 8-K | 7/3/00 |
| 4.1.1 | Amendment No. 1 to Four | 8-A/2G/A | 5/23/03 |
| 10.1 *608* | 1984 Stock Option Plan, as | 10-Q | 7/2/93 |
| 10.2 | Amended 1994 Performer | 10-Q | 4/4/08 |
| 10.3 | Form of Restricted Stock A | 10-K | 1/23/09 |
| 10.4 | 1994 Stock Option Plan, as | S-8 | 5/30/97 |
| 10.5 | 1997 Employee Stock Purc | 10-K | 1/24/08 |
| 10.6 | 1996 Outside Directors Sto | 10-Q | 4/12/06 |
| 10.7 | Forms of Stock Option Agr | S-8 | 6/16/00 |
| 10.8 | 1999 Nonstatutory Stock O | S-8 | 10/29/01 |
| 10.9 | 1999 Equity Incentive Plan | 10-K | 2/26/03 |
| 10.10 | 2003 Equity Incentive Plan | DEF 14A | 2/20/09 |
| 10.11 | Form of Indemnity Agreem | 10-Q | 4/4/08 |
| 10.12 | Form of Indemnity Agreem | 10-Q | 6/26/09 |
| 10.13 | Forms of Retention Agreem | 10-K | 11/28/97 |
| 10.14 | Second Amended and Res | 10-Q | 10/7/04 |
| 10.15 | Lease between ABC Comp | 8-K *602* | 3/28/07 |

FIG. 6D

METHODS AND A COMPUTING DEVICE FOR MAINTAINING COMMENTS AND GRAPHICAL ANNOTATIONS FOR A DOCUMENT

CROSS-REFERENCE TO RELATED APPLICATIONS

The present application is a continuation-in-part of U.S. patent application Ser. No. 14/817,444, filed Aug. 4, 2015, which claims priority to U.S. Provisional Patent Application 62/086,178, filed Dec. 1, 2014. The contents of both of these applications are incorporated herein by reference.

TECHNICAL FIELD

The present disclosure is related generally to electronic document collaboration platforms and, more particularly, to methods and a computing device for maintaining comments for a document.

BACKGROUND

Popular productivity software programs, such as those included in the Microsoft® Office® package, give users the ability to make comments directly within electronic documents. The typical workflow associated with such commenting features is as follows: a user authors a document and emails it to several other users for their input. Each of the other users then inserts comments into the document (which show up in the margins in the form of text bubbles) and sends the commented version of the document back to the creator (possibly copying the other reviewers). Additionally, each reviewer might choose to make edits to the document or make comments within the actual text of the document (essentially creating a new version of the document). It is then up to the author to synthesize and harmonize all of the various comments and revisions.

One problem that arises with the current document commenting paradigm is that there are no enforced restrictions on the ability of commentators to make changes to the document. Another is that the comments themselves, even when not applied in-line with the text, tend to be embedded within the documents being commented on. Thus, when the person responsible for creating the final version of the document has to incorporate all of the disparate comments and edits, he or she may be forced to ignore or modify comments that are inconsistent with others.

DRAWINGS

While the appended claims set forth the features of the present techniques with particularity, these techniques, together with their objects and advantages, may be best understood from the following detailed description taken in conjunction with the accompanying drawings of which:

FIG. 4A through FIG. 4I show a user interface according to an embodiment.

FIG. 6A through FIG. 6E depict a user interface displaying an auxiliary document, according to various embodiments.

DESCRIPTION

Figure 1:
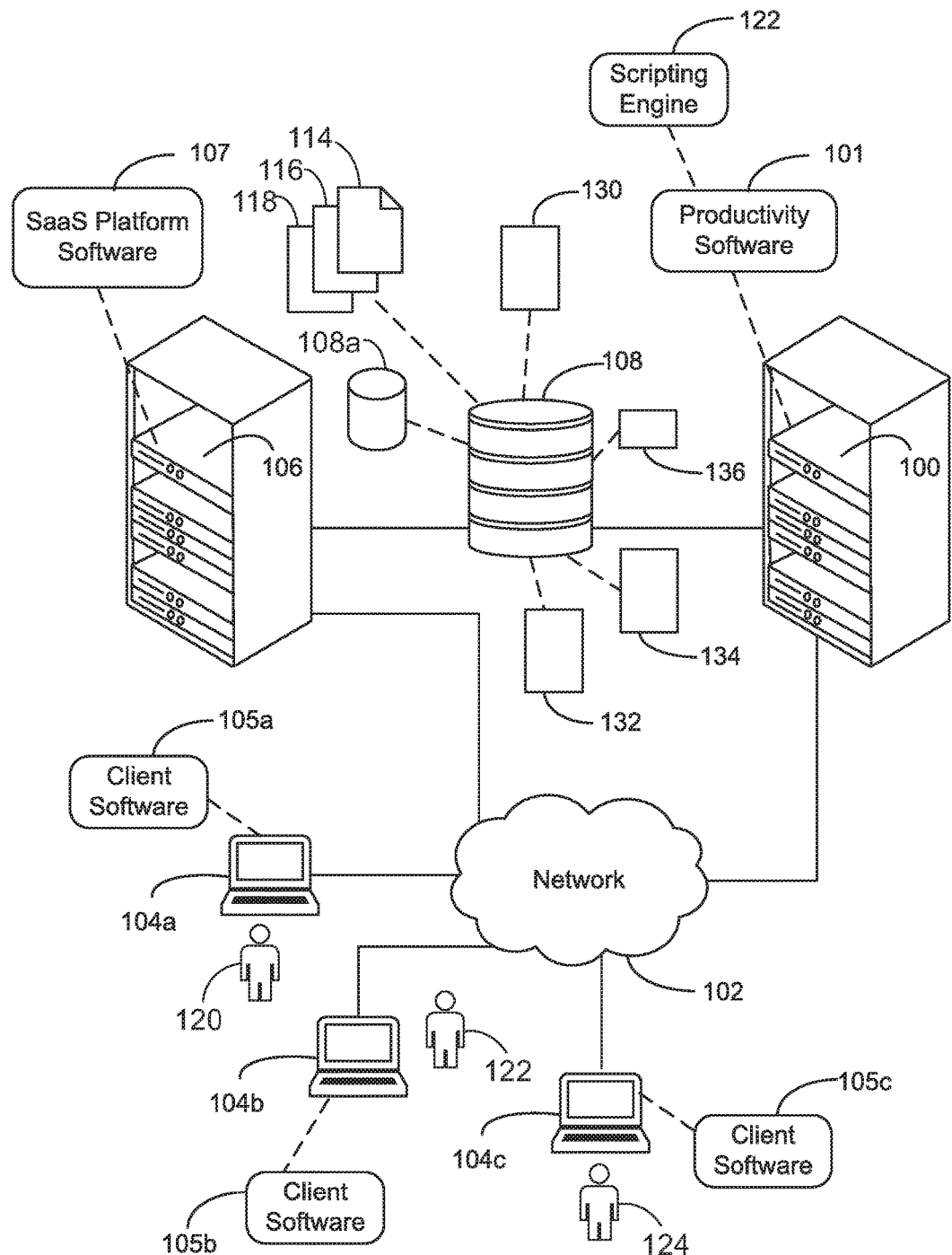
FIG. 1 is an example of a networking environment in which various embodiments of the disclosure may be employed.

This disclosure will often refer to a "data entity." The term "data entity" or "entity" as used herein refers to a separately accessible collection of data that resides in a database, such as an "object" within an object-oriented database or an "entity" on the Google App Engine™ platform. Also, this disclosure will often use the term "key name." As used herein, a key name is an identifier, such as a globally unique identifier ("GUID"), which uniquely identifies an entity. In the examples described herein, a key name is usable to retrieve data entities from a database. In practice, a key name may be a long hexadecimal value (e.g., 32 digits). This disclosure also refers to different types of "identifiers" or "IDs" (such as a "section id," "table id" or "paragraph id"). As used herein, an id may be a GUID and have a structure similar to that of a key name. "User content" as used herein refers to the parts of a document that are viewed by users, such as text, tables, spreadsheets, images, and drawings (as opposed to metadata that is usable by a computing device but not generally viewed by a user). Finally, "document" as used herein includes any type of electronically stored document, including text documents, spreadsheets, presentations, drawings, diagrams, and composite documents that include elements of different types of documents.

The disclosure is generally directed to methods and a computing device for maintaining comments and graphical annotations on a document in which a first computing device receives, from a second computing device: (a) a graphical annotation for a document displayed on the second computing device, and (b) a comment for the graphical annotation. The first computing device stores the graphical annotation in a database in a graphical annotation data entity, stores the comment in the database in a comment data entity, and associates the graphical annotation data entity with the comment data entity within the database.

In an embodiment, a first computing device provides a document to a second computing device (e.g., a client computing device) as follows. The first computing device (e.g., cloud-based server) transmits instructions to the second computing device (e.g., a notebook computer, tablet computer, or smartphone). The instructions (e.g., a block of mark-up language text or a set of drawing instructions delivered via JavaScript®) are usable by the second computing device to render at least a portion of the document on a display.

According to an embodiment, the first computing device receives and maintains user comments and graphical annotations for a document by defining an "anchor" for each comment or annotation. The anchor is the location on a document (or point on a virtual overlay of the document) from which the rendering of the comment or annotation is based. In the case of a comment, for example, the anchor may be a piece of text in the document, a location within a paragraph of the document, a location within a section of the document, or an XY coordinate of an interface on which the document is displayed.

In some embodiments, the user's computing device allows the user to select the "anchor" by selecting content (e.g., a section of text, an image, or a table cell). The content is selected and/or highlighted, and a comment is "anchored" to that selection.

In some embodiments, the computing device anchors XY comments to a single content location in the document (e.g., one character of text or a table cell). Selection-based comments may have two anchor points, representing the starting and ending points of the associated content selection. These two content anchor points are independent, so, for example, it is possible for a "selection" to start in a paragraph of text and end in a table cell.

In an embodiment, the computing device determines the content to which the XY comment applies based on a combination of hierarchical identifiers, such as document id, section id, paragraph id, and character offset. The computing device can use this data to traverse through the hierarchy of data to the most specific piece of content (e.g., character in a paragraph, table cell, or image).

According to an embodiment, in order to maintain comments and graphical annotations for a document, the first computing device receives an asset identifier and a user comment or graphical annotation from a second computing device. The asset identifier uniquely identifies a discrete subset of user content within the document (referred to herein as an "asset," examples of which include a section, a paragraph, a table, or a cell within a table). The first computing device stores the comment or graphical annotation (e.g., in a cloud-based database) in a data entity that is separate from the data entity in which the user content is stored. The first computing device associates the comment or annotation with the asset using the asset identifier and instantiates one or more of: a comment entity, a comment thread entity, and a graphical annotation entity that maps the asset identifier to the unique identifier of an entity containing the content). In some embodiments, the first computing device receives, from the second computing device, location data in addition to the asset identifier (e.g., character offsets or character lengths, to assist in identifying the subset of user content to which the comment applies).

In an embodiment, a graphical annotation is described by (a) annotation data, which includes data regarding what the annotation is (e.g., drawing area, vector data regarding lines, text to be included in the annotation), and (b) location data, which includes data regarding where the annotation is to be located (e.g., one or more of a coordinate (such as an XY coordinate) on the display, a coordinate on an drawing canvas that gets overlayed on a document, an ID corresponding to user content (e.g., a document ID, a paragraph ID, a section ID, and a character offset)).

According to an embodiment, a method and computing device for rolling forward annotations involves a computing device that displays the document being annotated (an auxiliary document in the present set of examples) in view-only or non-editable form and defines a transparent drawing canvas or overlay "on top" of the document.

Various embodiments of the disclosure are implemented in a computer networking environment. Turning to FIG. 1, an example of such an environment is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104a, a third computing device 104b, a fourth computing device 104c, and a fifth computing device 106. The fifth computing device 106 is communicatively linked to a media storage device 108 (e.g., a redundant array of independent disks). For the sake of example, it is assumed that a first user 120 operates the second computing device 104a, a second user 122 operates the third computing device 104b, and a third user 124 operates the fourth computing device 104c. Each of the computing devices 104a, 104b, and 104c executes client software (reference numerals 105a, 105b, and 105c, respectively). One possible implementation of the client software is a web browser.

Residing within the media storage device 108 is a database 108a containing multiple documents, three of which are depicted in FIG. 1: a first document 114, a second document 116, and a third document 118. The first computing device 100 and the fifth computing device 106 are depicted as rack-mounted servers, while the second, third, and fourth computing devices 104a, 104b, and 104c are depicted as a notebook computers. However, the computing devices depicted in FIG. 1 are merely representative. Other possible implementations of a computing device include a desktop computer, a tablet computing, and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 108.

For convenient reference, the first computing device 100 will also be referred to as a "productivity server 100" and the fifth computing device 106 will be also be referred to as a "database server 106." Although depicted in FIG. 1 as separate devices, in some embodiments, the functionality of the productivity server 100 and the database server 106 are on the same device. The productivity server 100 executes productivity software 101 and the database server 106 executes software as a service ("SaaS") platform software 107. Under the control of the productivity software 101, the productivity server 100 interacts with the database server 106 and the computing devices 104a, 104b, and 104c to allow the computing devices to access the first document 114, the second document 116, and the third document 118 so that the first user 120, the second user 122, and the third user 124 can collaborate in commenting on the documents.

According to an embodiment, a main document and an auxiliary document are stored in the database 108a (potentially along with other data) and are represented by elements 130 (main document), 132 (first version of the auxiliary document), and 134 (second version of the auxiliary document). Also, annotation data is stored in the database 108a separately from the aforementioned documents. The annotation data is stored in a data structure 136. In an embodiment, the data structure 136 is a JavaScript Object Notation ("JSON") object that conforms to one or more schemas maintained by the productivity software.

In an embodiment, the productivity software 101 includes a scripting engine 122 that translates script and script-based messages (e.g., those used in JavaScript) from the client software 105a, 105b, and 105c into a form that can be stored in the data structure 136 and, conversely, translates the annotation data (e.g., the location and graphics properties of the annotation) into a form that the first computing device 100 can transmit to any of the computing devices 104a, 104b, and 104c (e.g., translates JSON data into HTML canvas drawing commands that get transmitted to the web browser 105a for rendering on the display of the second computing device 104a).

In an embodiment, a commenting and annotating feature allows a computing device (such as one of the computing devices of FIG. 1) to detect the location on the display where a comment or graphical annotation is to be entered (i.e., the location that is to serve as the anchor for the comment) and to associate the comment or graphical annotation with at least one of: (a) the display coordinates (e.g., the XY coordinates) of the document or (b) the underlying asset (which may be determined by, for example, mapping the location (e.g., the XY display coordinates) to the underlying asset (e.g., the paragraph and character offset)). Additionally, a comment may be associated with an annotation graphic. The computing device may then have that comment or annotation graphic be stored (e.g., by the productivity server 100) separately from the content itself.

In some embodiments, a computing device (such as a computing device of FIG. 1) presents (on the user interface) a non-editable version of a document (e.g., a document on which the user has no editing rights), and the user is limited to reviewing the document. In other embodiments, the user's computing device presents an interface that allows the user to make changes to the document in addition to commenting and annotating. Furthermore, in some embodiments, the computing device allows a user to anchor a comment or annotation on the basis of an XY position (which the computing device may, in some embodiments, map to the underlying content). Possible ways in which the computing device may keep track of the location of such an anchor include (1) an absolute coordinate (e.g., an absolute screen coordinate), (2) a distance offset from a reference point, and (3) a relative offset from a reference point. An example of a reference point is an upper left corner of a visual representation of an asset (e.g., a paragraph or individual character of text). An example of a relative offset from a reference point is a percentage offset from an upper left corner of an asset, with 100% being the distance from the upper left corner of the asset to the lower right corner of the asset. Examples of units of distance for an offset include characters and points.

For example, the user executes a long tap/click (or right-click) somewhere in the document area, which triggers the computing device to create (or request the productivity server to create) an XY comment (a popover dialog is displayed for the user to type in a comment). The user's computing device (and all other users' computing devices that open the document) displays an icon indicating the existence of an XY comment displayed at that document location thenceforth. Again, no highlighted text selection is displayed to the user by the computing device, though the comment is invisibly "anchored" to a specific piece of content by the productivity server 100.

Figure 2:
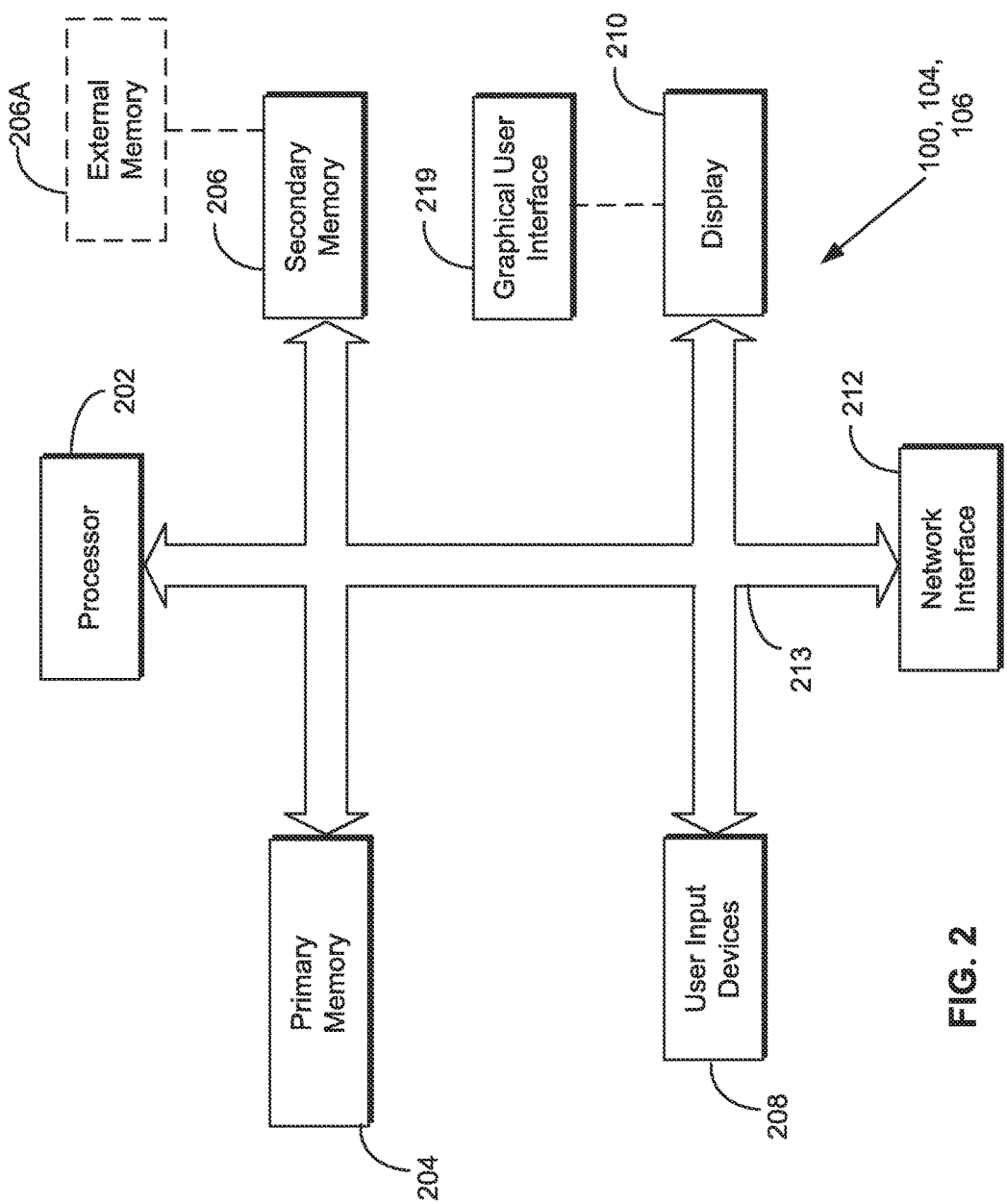
FIG. 2 is a block diagram of a computing device according to an embodiment.

According to an embodiment, one or more of the computing devices of FIG. 1 (including the media storage device 108) have the general architecture shown in FIG. 2. The device depicted in FIG. 2 includes a processor 202 (e.g., a microprocessor, controller, or application-specific integrated circuit), a primary memory 204 (e.g., volatile memory, random-access memory), a secondary memory 206 (e.g., non-volatile memory), user input devices 208 (e.g., a keyboard, mouse, or touchscreen), a display 210 (e.g., an organic, light-emitting diode display), and a network interface 212 (which may be wired or wireless). The memories 204 and 206 store instructions and data. The processor 202 executes the instructions and uses the data to carry out various procedures including, in some embodiments, the methods described herein.

Each of the elements of FIG. 2 is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors.

The term "local memory" as used herein refers to one or both the memories 204 and 206 (i.e., memory accessible by the processor 202 within the computing device). In some embodiments, the secondary memory 206 is implemented as, or supplemented by an external memory 206A. The media storage device 108 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a report on the display device 210, and which permits a user to make inputs into the report via the user input devices 208.

The computing devices of FIG. 1 (i.e., the processor 202 of each of the computing devices) are able to communicate with other devices of FIG. 1 via the network interface 212 over the network 102. In an embodiment, this communication takes place via a user interface that the productivity server 100 provides to the computing devices 104a, 104b, and 104c. The specific nature of the user interface and what the user interface shows at any given time may vary depending what the user has chosen to view. Also, multiple users may interact with different instances of the user interface on different devices. In some embodiments, the productivity server 100 carries out calculations to determine how content is to be rendered on a computing device, generates rendering instructions based on those calculations, and transmits those rendering instructions to the computing device. Using the received instructions, the computing device renders the content on a display. In other embodiments, the productivity server 100 transmits instructions regarding an asset to a computing device. In carrying out the received instructions, the computing device performs the appropriate calculations locally to render the content of the asset on a display.

Figure 3:
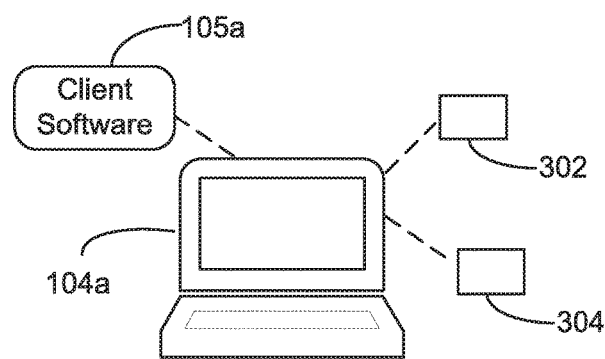
FIG. 3 is a block diagram showing the relationship between the data structure that maintains a displayed document and the data structure that holds data regarding annotations, in an embodiment.

According to an embodiment, a computing device (such as one of the computing devices 104a, 104b, and 104c) displays a document being annotated (an auxiliary document in the present set of examples) in view-only or non-editable form and defines a transparent drawing canvas or overlay "on top" of the document. From the perspective of a user, the annotations appear to be attached to the document being annotated. FIG. 3 shows a possible client-side architecture for implementing this embodiment, with the second computing device 104a serving as a representative example. The client software 105a maintains, in a first data structure 302 (or first set of data structures), the portion of the document being viewed. The client software 105a renders annotation graphics on an overlay (e.g., an HTML canvas) that is maintained in a second data structure 304 (or second set of data structures). From the perspective of a user, the annotation graphics appear to be attached to or part of the document being annotated. In various embodiments, comments may be associated with (a) the annotation graphics, (b) the display coordinates (e.g., XY coordinates) of the annotation graphics, and/or (c) the underlying asset with which the annotation graphics are associated.

Figure 4A:
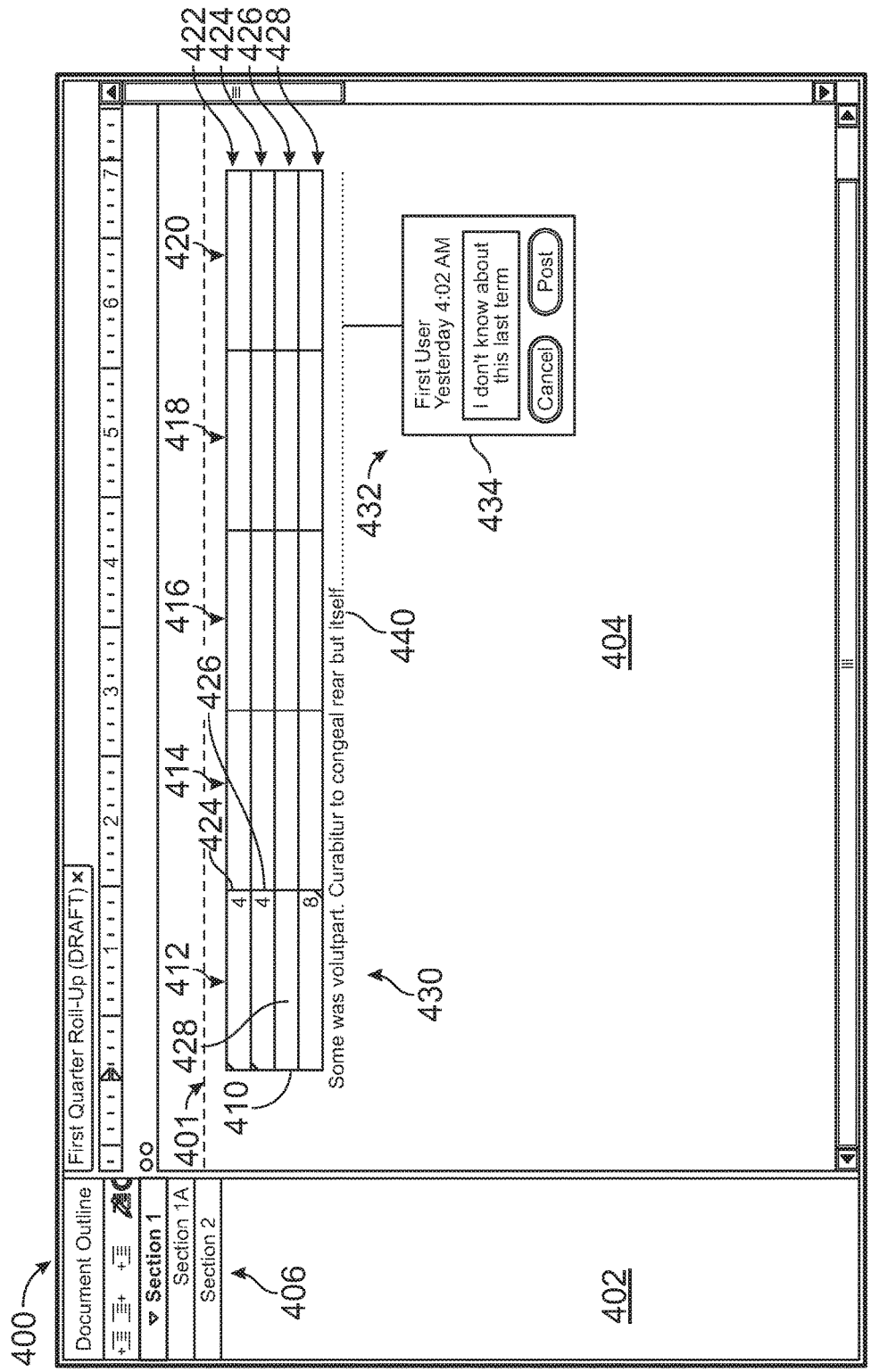

Turning to FIG. 4A, an example of a user interface that allows a user to anchor comments to selected portions of text is shown. The user interface 400 includes an outline area 402 and a user content area 404. In the outline area 402 is an outline 406, which shows the section structure of the document. The document currently being displayed has three sections, which are listed in the section outline 406 by their friendly names: Section 1, Section 1A (which is a subsection of Section 1), and Section 2. When a computing device displaying the user interface 400 detects a user input on the section outline 406 (e.g., detects a mouse click on a friendly name of a section) the computing device interprets the user input as a request for a section and reacts by requesting the section from the productivity server 100 (or, if the computing device has previously received the section from the productivity server 100, by switching to the section) and rendering the section on the display 210.

Continuing with the example of FIG. 4A, the user content includes a first paragraph 401 having a table 410. The table 410 includes a first column 412, a second column 414, a third column 416, a fourth column 418, and a fifth column 420. The table also has a first row 422, a second row 424, a third row 426, and a fourth row 428. The user content also includes a second paragraph 430 of text.

Figure 4B:
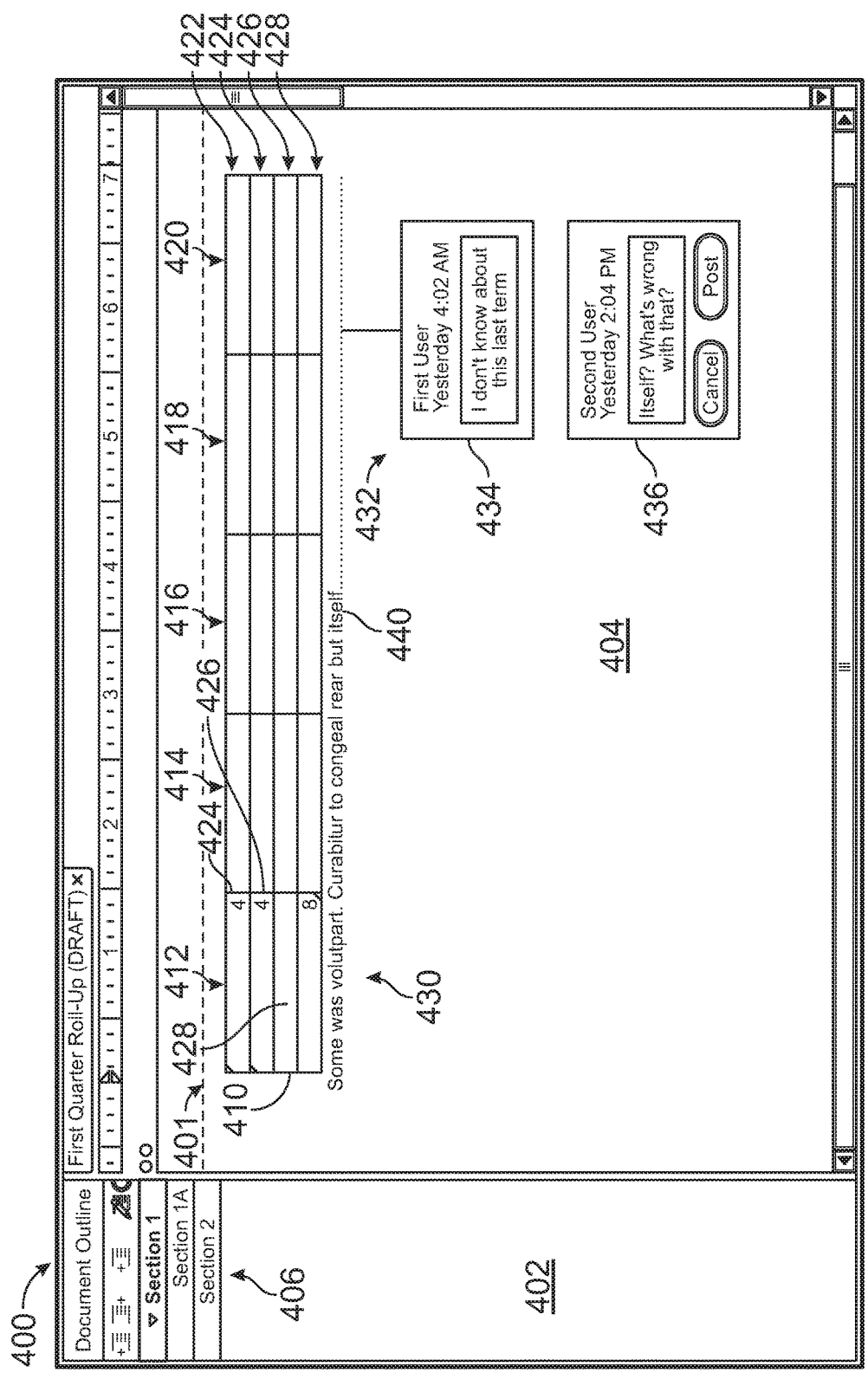
Figure 4C:
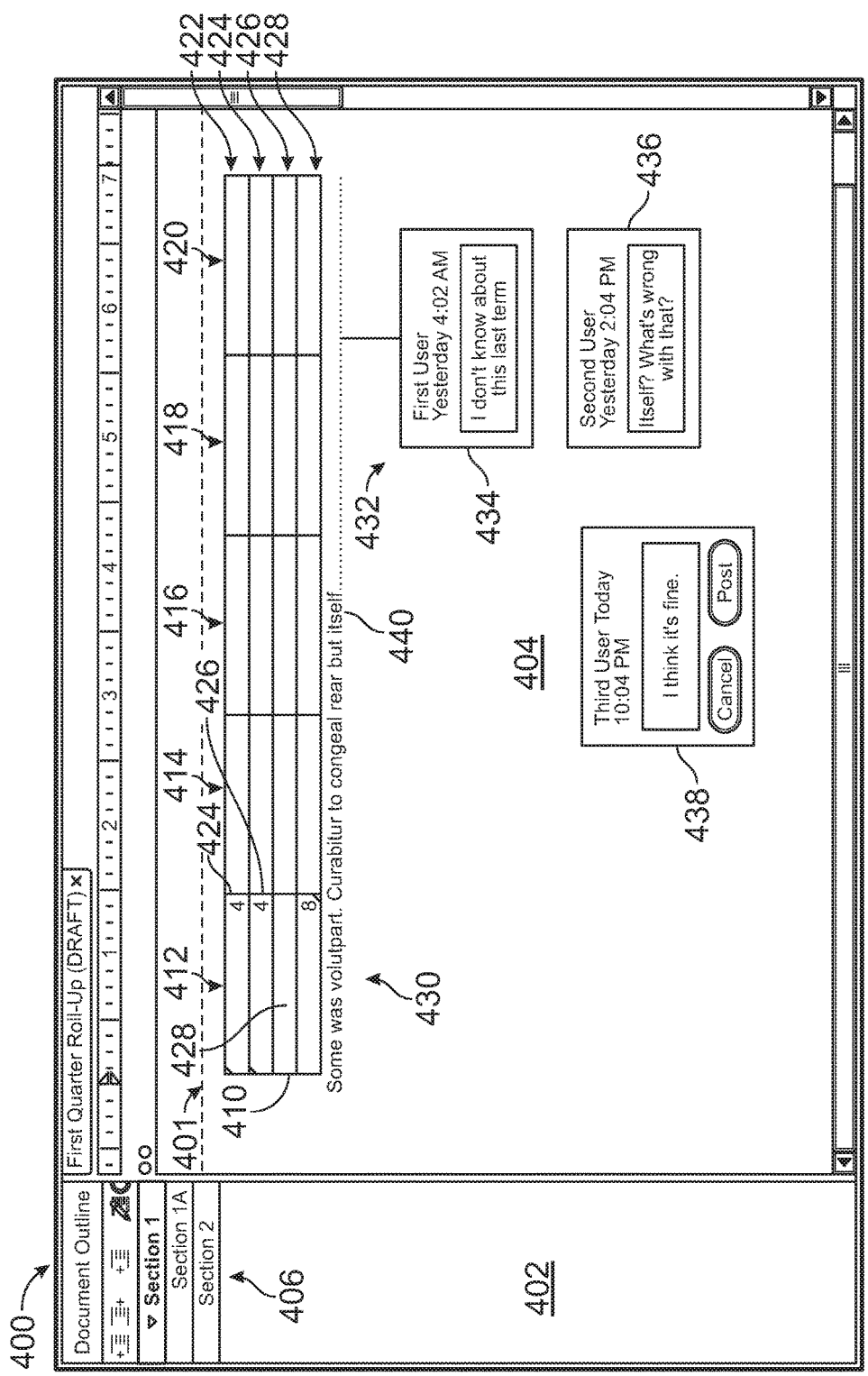

According to an embodiment, each instance of the user interface 400 provides the users of FIG. 1 (on their respective computing devices) with the ability to input comments (e.g., reviewer comments regarding the content shown in the user content area 404) and share those comments with the other users. In order to do so, a user need only place the cursor in some location on the user interface 400 and interact with an on-screen control (e.g., a right-click pop-up menu or menu from an on-screen control or toolbar, or a hand drawn comment entered with a stylus). If desired, the user may also select user content (e.g., to indicate content to which the comment pertains). In FIG. 4A, FIG. 4B, and FIG. 4C, the portion of the document being shown on the user interface 400 has anchored thereto a comment thread 432, which includes a first comment box 434, a second comment box 436 (on FIGS. 4B and 4C), and third comment box 438 (on FIG. 4C).

To illustrate the commenting functionality of the user interface 400, assume that the first user 120 views the user interface 400 on the second computing device 104 and wishes to make a comment. The first user 120 interacts with the user interface 400 via one of the user input devices 208, selects a portion 440 of the user content (in this case, the word "itself"), and right-clicks to display a pop-up menu (not shown). The first user 120 then selects "Add Comment." The user interface 400 displays the first comment box 434, allowing the first user 120 to add the comment. The first user 120 then clicks the "Post" button on the first comment box 434 (FIG. 4A). Later, the second user 122 views that same part of the document (i.e., the part having the commented portion 440) on the user interface 400 on the third computing device 106 and wishes to make a comment in response to the first user's comment (i.e., to add to the comment thread 432). The second user 122 interacts with the user interface 400 (in a manner similar to how the first user 120 interacted with the user interface 400) and enters a comment into the second comment box 436 (FIG. 3B). Finally, the third user 124 views the portion of the document that includes the commented portion 440 and selects the option to add a comment to the comment thread 432. The third user 124 interacts with the user interface 400 in a manner similar to how the first user 120 and the second user 122 did when entering comments. The third user 124 enters a comment into the third comment box 438 (FIG. 4C). The various actions taken by the productivity server 100 to associate the comment thread 432 and the various comments in the thread with the selected content 440 will be described in further detail below.

Figure 4D:
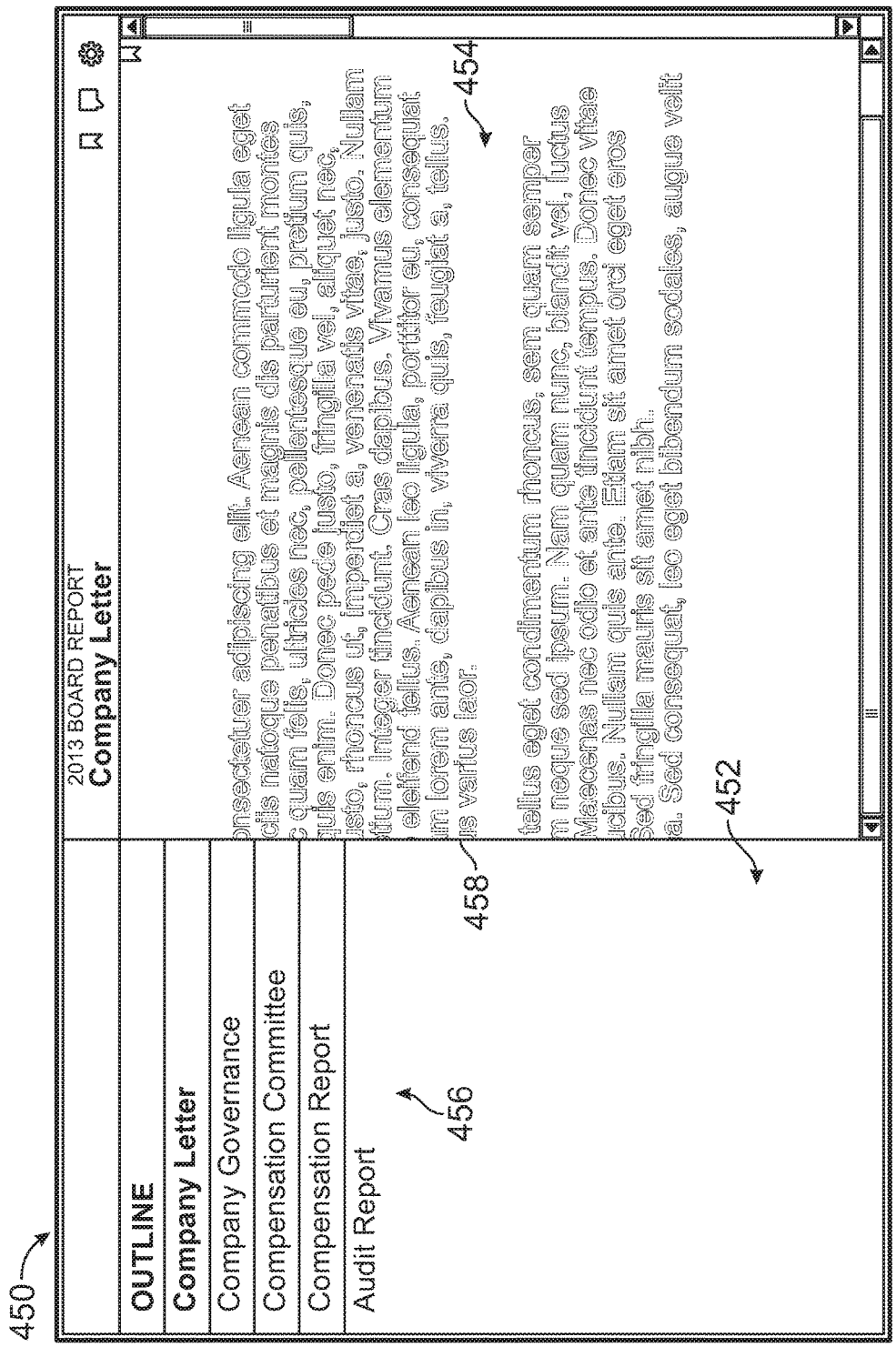

Turning to FIG. 4D, an example of another embodiment of a user interface is shown, which may be employed on a touchscreen interface (e.g., on a tablet computer). In this embodiment, the user is not able to select portions of text directly, but is able to select an XY location on the document. The user interface 450 includes an outline area 452 and a user content area 454. In the outline area 452 is an outline 456, which shows the section structure of the document. In the example of FIG. 4D, the document currently being displayed has five sections, which are listed in the section outline 456 by their friendly names. The functionality of the user interface 450 of FIG. 4D (and FIG. 4E through FIG. 4I) is otherwise similar to that of the user interface 400 of FIG. 4A through FIG. 4C except for the commenting functionality (discussed below).

Figure 5A:
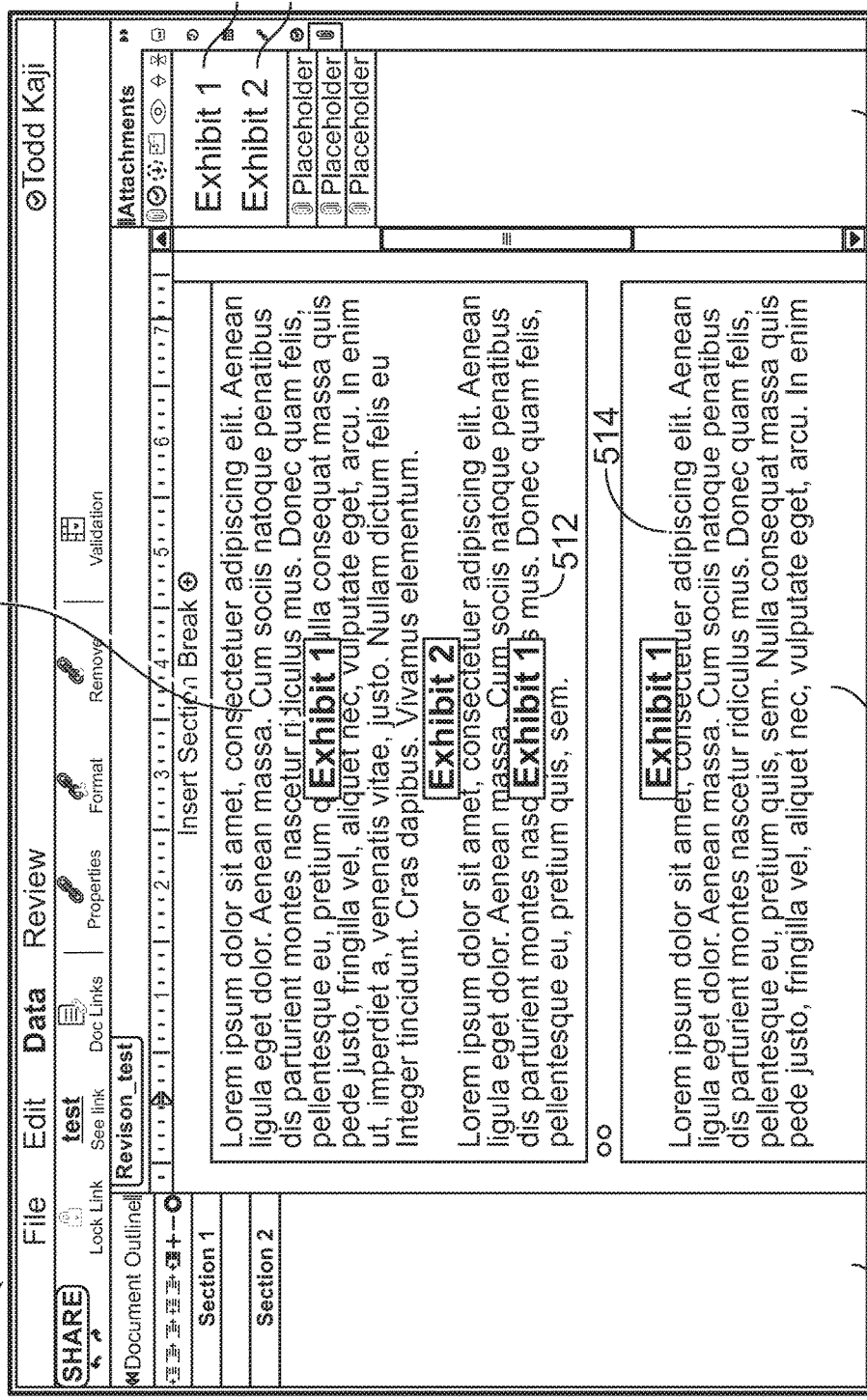
FIG. 5A through FIG. 5D depict a user interface displaying a main document, according to various embodiments.

In an embodiment, a computing device (such as one or more of the computing devices of FIG. 1) displays icons or other representations of auxiliary documents so that they appear on a user interface as "attachments." Turning to FIG. 5A, an example of a user interface configured according to an embodiment is shown. The user interface is displayed on a second computing device (such as one of the computing devices 104a, 104b, and 104c) by a client program (such as one of the client programs 105a, 105b, and 105c) according to instructions that the first computing device 100 (e.g., the productivity software 101) provides to the second computing device. The user interface, generally labeled 500, includes a display area 502 (illustrated in FIG. 5A as a viewer pane) an attachment pane 504, and a section pane 506. The attachment pane 504 includes a list of one or more auxiliary documents, represented in FIG. 5A by entries 508 (though other ways of representing the auxiliary documents are possible, including icons). The auxiliary documents are referred to in the user interface 500 as "attachments," but it is to be understood that the auxiliary documents and the main document are not "attached" in the physical sense, but rather are "associated" from the point of view of the main document. The section pane 506 lists sections of the document being displayed. A user interacting with the user interface 500 on the second computing device 104 can select a portion of a main document (e.g., a block of text or a cell in a table) and associate an auxiliary document with the main document as a whole or associate the auxiliary document with a selected portion of the main document. For ease of reference, the main document may sometimes be referred to as the "first document" and the auxiliary documents may be referred to as the second, third, etc. document.

Figure 5B:
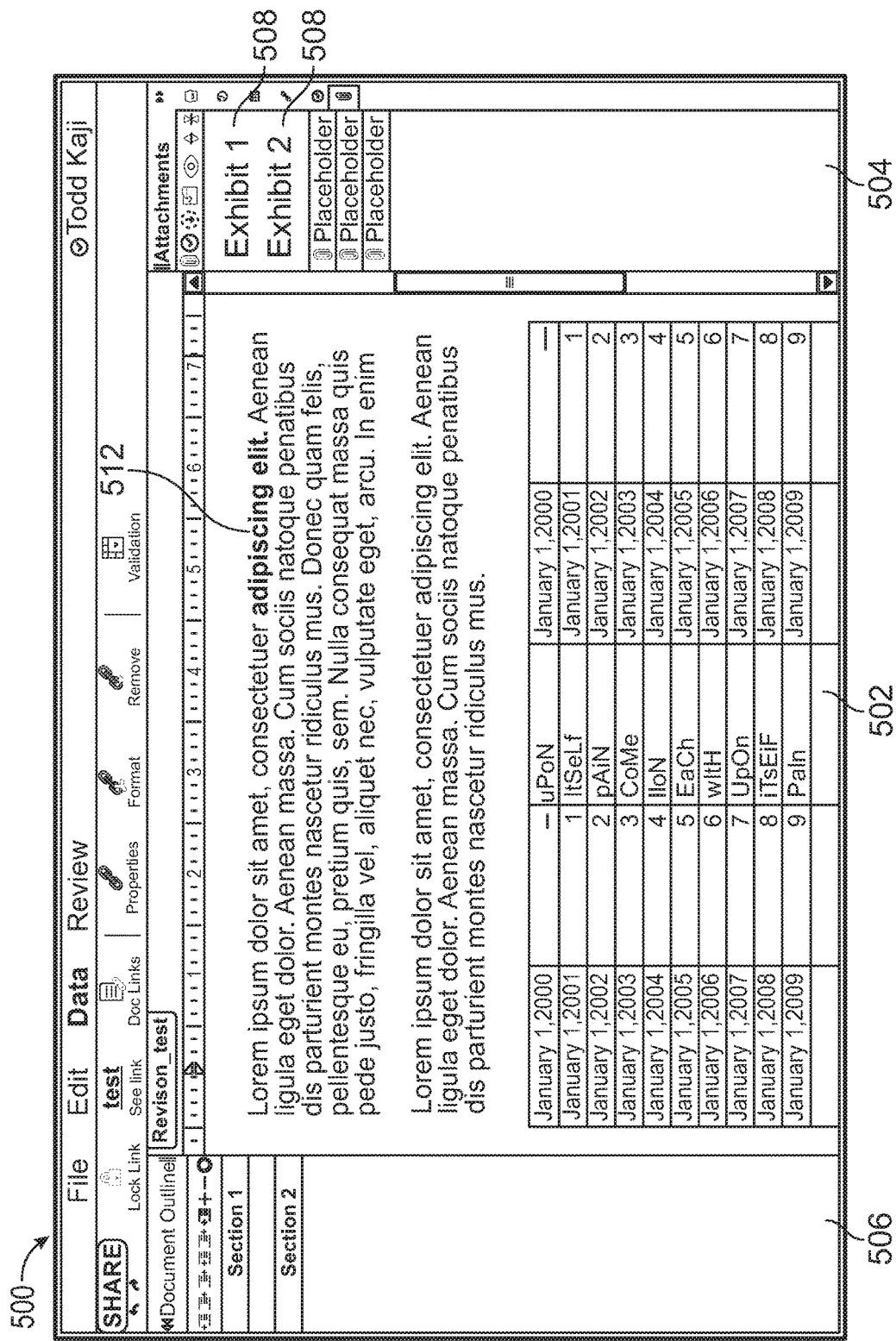
Figure 5C:
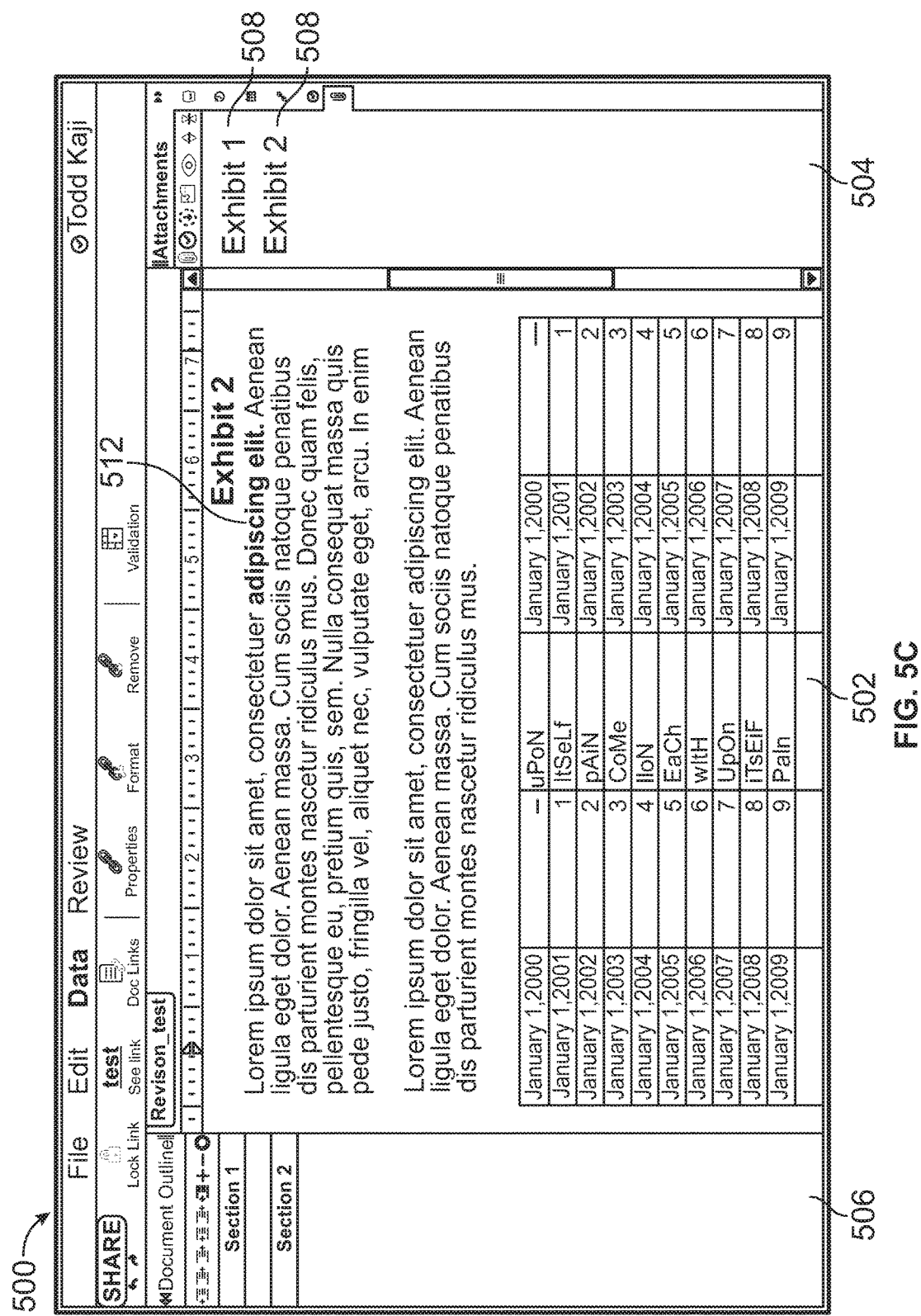

For example, in the document being displayed in FIG. 5A has two sections, as noted in the section pane 506. The section currently being displayed the first section, and blocks of text 510, 512, and 514 are associated with Exhibit 1, while block of text 512 is associated with Exhibit 2. Referring to FIG. 5B, in the second section of the document (shown in the display area 502 of FIG. 5B), there are no annotations yet (i.e., no associations between any of the auxiliary documents listed in the attachment pane 504 and any of the text in the portion of the document being displayed in the display area 502) but the entries 508 representing the auxiliary documents remain visible in the attachment pane 504. By making the appropriate entry into the user interface 500, a user may anchor one or more of the documents listed in the attachment pane 504 with one or more portions (block of text, value, etc.) of the second section as well, as shown in FIG. 5C. In some embodiments, the mechanics underlying this anchoring functionality are the same as those described herein for commenting and annotating.

Figure 5D:
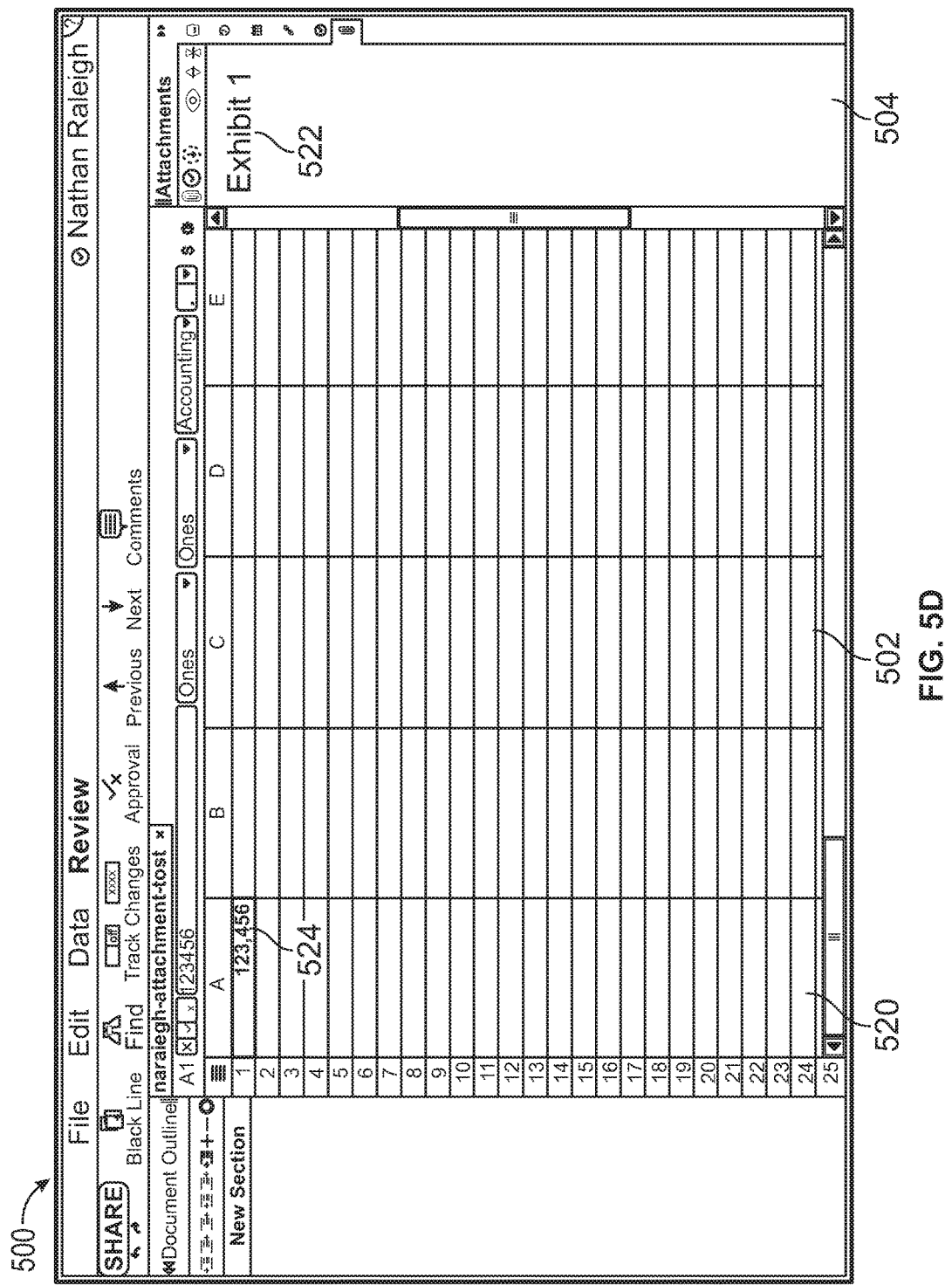

Any type of document may be displayed in the display area 502. For example, FIG. 5D shows a document (e.g., a spreadsheet) having a table 520. A cell 524 of the table 520 is associated with an auxiliary document (Exhibit 1—represented by an entry 522 in the attachment pane 504).

To view an auxiliary document (in an embodiment), a user may perform a gesture (such as mouse clicking) on the entry representing the auxiliary document (e.g., clicking on "Exhibit 1"). In response, the second computing device 104 sends the appropriate request to the first computing device 100, which responds by transmitting an update to the user interface 500 (e.g., delivering a new web page). After the update, the second computing device 104 will display another version of the user interface.

To illustrate, assume that the user clicks the entry 522. The first computing device 100 responds by transmitting the user interface depicted in FIG. 6A—user interface 600. The user interface 600 includes a display area 602 (depicted as a viewer pane) that is currently displaying Exhibit 1 (a document having text).

As previously noted, a computing device (such as one or more of the computing devices of FIG. 1) that is configured according to an embodiment is able to receive an input of a graphical annotation, anchor the annotation to a portion of the document (using one or more of the various anchoring schemes described herein), and display the graphical annotation. Using the computing device 104a as an example, the process for carrying out this operation according to an embodiment involves the following: The computing device 104a (e.g., via the client software 105a) receives a user input (e.g., detects a user gesture such as a right-click and a selection from a pop-up menu) and, in response, adds a graphical annotation (e.g., a check mark, a geometric shape, or line figures in the shape of text) to a displayed document. The client software 105a renders a graphic corresponding to the selected annotation on a virtual drawing canvas (e.g., within the data structure 304), which results in the graphic annotation appearing in a display area of a graphical user interface instantiated by the client software 105a. Examples of graphical annotations are shown with reference numbers 604, 606, and 608. The computing device 104a then transmits, to the productivity software 101, data indicating the location of the annotation (e.g., in terms of XY coordinates or in terms of paragraph/word) as well data indicating the graphics being used to implement the annotation (e.g., checkmark, textbox, line color, line width, start point of lines, endpoint of lines). The productivity software 101 then stores the location data and data regarding the annotation graphic (e.g., the color, thickness) in a data structure within the database 108.

Figure 7:
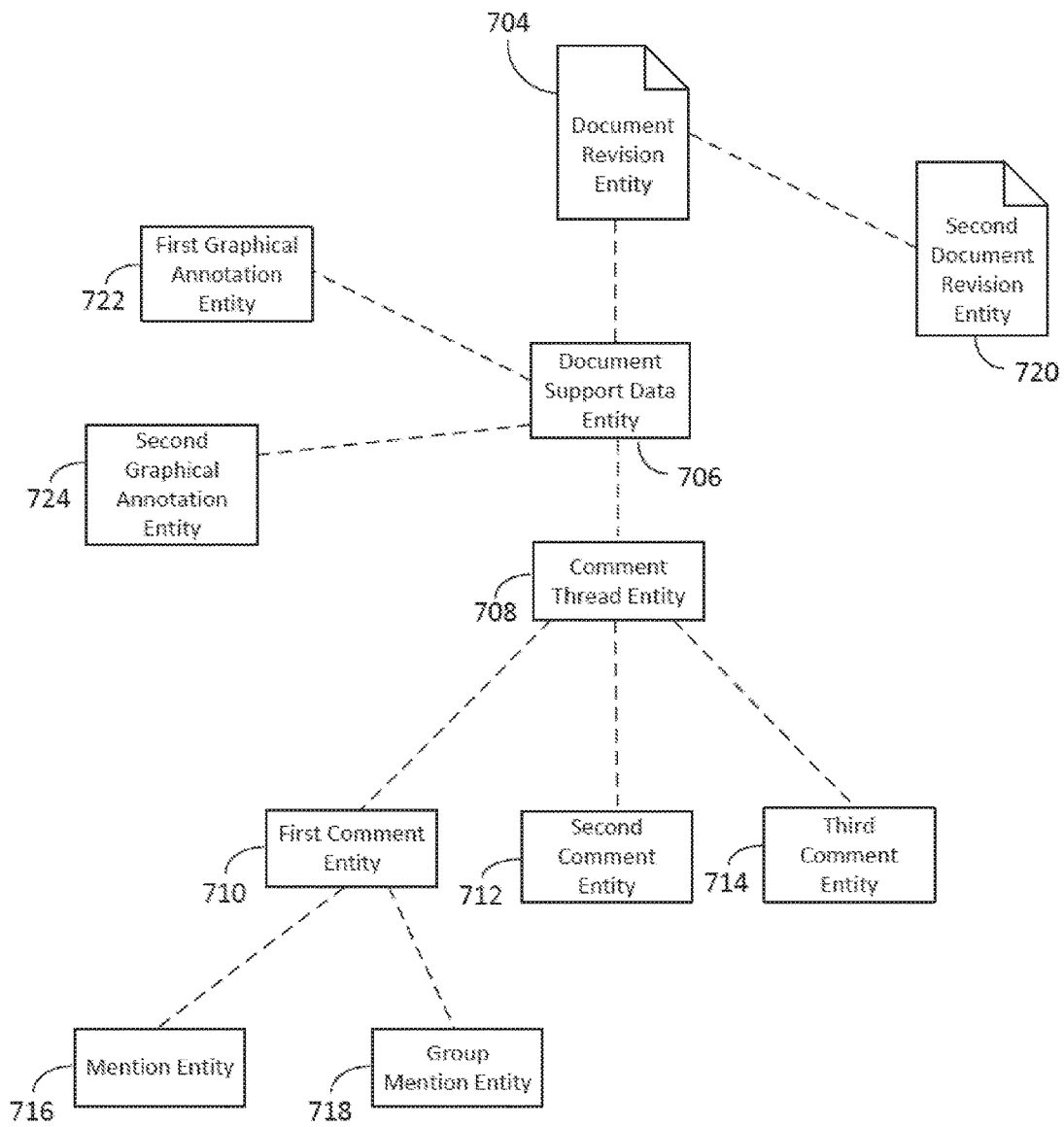
FIG. 7 shows an example of how the various entities of a displayed document are related to one another according to an embodiment.

In an embodiment, the productivity server 100 organizes each document into multiple entities, each of which is separately stored in, and separately retrievable from the media storage device 108. In one embodiment, the entities that constitute a document have the organizational structure depicted in FIG. 7, in which the topmost entity is a document revision entity 704. Although only one document revision entity is depicted in FIG. 7, there may be multiple document revision entities associated with each document. Associated with the document revision entity 704 are a document support data entity 706, and one or more comment thread entities, represented in FIG. 7 by the comment thread entity 708, as well as one or more comment entities per comment thread entity, represented by the comment entities 710, 712, and 714. Also associated with the document revision entity 704 (by way of one or more of the comment entities) are one or more mention entities (represented by the mention entity 716) and one or more group mention entities (represented by the group mention entity 718). If the document represented by the document revision entity 704 is updated and "shared," such that a new version is created, then the productivity server 100 can create a second document revision entity 720 to represent the new version. One or more graphical annotation entities (represented in FIG. 7 by a first graphical annotation data entity 722 and the second graphical annotation data entity 724) may be associated with the document revision entity 704 (via the document support data entity 706). Each graphical annotation entity includes data sufficient to describe the nature and location of a graphical annotation.

Each of the entities depicted in FIG. 7 includes one or more pieces of data. In an embodiment, the document revision entity 704 includes a key name and a reference to (e.g., the key name of) the document support data entity 706, the document support data entity 712 includes a key name and a mark-up language block that identifies text within the document that has been selected as being the anchor for a comment or annotation, the comment thread entity 708 includes a key name and a reference to the document support data entity 706, and the comment thread entity 708 includes a key name and data that indicates the content in the document with which the comment thread is to be associated (e.g., a section id of the associated section and an asset id). Additionally, each comment entity (represented by the first comment entity 710 in this example) includes a key name, a creator id, a remark, and a reference to the comment thread entity 708 (the thread to which the comment belongs), a reference to any mentions or group mentions for the comment (e.g., the key name of the mention entity 716 and the group mention entity 718, if present). Finally, each mention entity 716 includes the user ID of the user to whom the comment is directed, and each group mention entity 718 includes the group ID of the group to which the comment is directed.

As noted above, various embodiments of the disclosure include a commenting feature and a graphical annotation feature that allows a computing device to detect the location on the display where a comment or graphical annotation is to be placed (i.e., the location that is to serve as the anchor for the comment), map the location (e.g., the XY display coordinates) to the underlying asset (e.g., the paragraph and character offset), and have that comment be stored (e.g., by the productivity server 100) separately from the content itself. The way in which a computing device carries out this commenting feature depends on the architecture being employed by the computing device. Two types of architectures will now be described with reference to FIG. 8A and FIG. 8B using the second computing device 104a as an example.

Figure 8A:
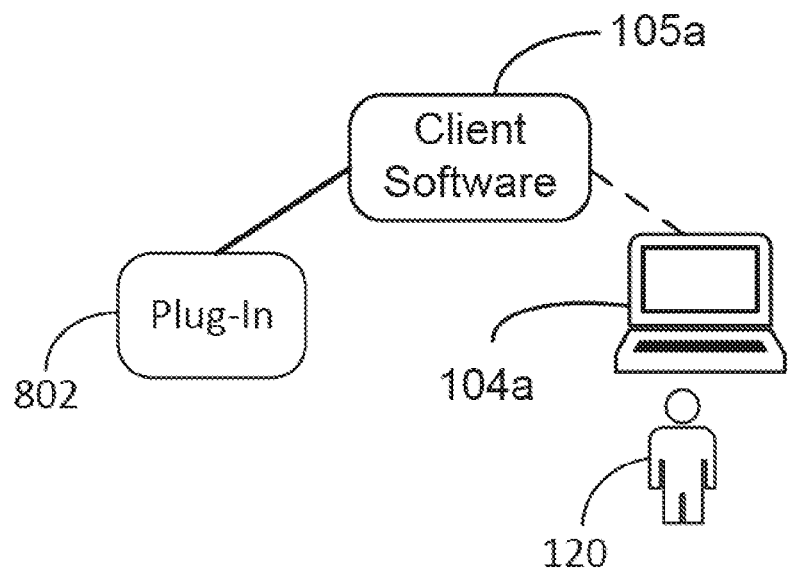
FIG. 8A and FIG. 8B show different possible software architectures for a computing device from FIG. 1 according to an embodiment.

Turning to FIG. 8A, in an embodiment, the second computing device 104a executes the client program 105a, which is assumed to be a web browser in this example. The client program 105a executes a plug-in program 802 (e.g., an Adobe Flash® plug-in). The plug-in program 802 ("plug-in 802") and the productivity server 100 communicate with one another using, for example, a scripting language such as JavaScript® or ActionScript® in combination with hypertext transport protocol ("HTTP") requests and responses (e.g., GET and POST). The plug-in 802 receives an input from a user (e.g., as a mouse click on an icon representing a document). In response to the input, the computing device, under the control of the plug-in 802, transmits a request for the document to the productivity server 100. The productivity server 100 then transmits a corresponding request (e.g., an HTTP "GET" request or a structured database query) that includes the key name of the document (i.e., the key name of the document parent entity) to the database server 106. The database server 106 retrieves the entities that constitute the document from the media storage device 108 and transmits the entities to the productivity server 100. The productivity server 100 transmits the relevant mark-up language blocks to the computing device which, under the control of the plug-in 802, interprets the mark-up language blocks and renders the mark-up language blocks on the display 210 which, in effect, renders the document (e.g., a particular section of the document) on the display 210.

To illustrate, assume that the first user 120 interacts with the user interface 400 (which is being displayed by the plug-in 802 on the second computing device 104) to request the first section of the first document 114. The first user 120 does this by left-clicking on the "Section 1" friendly name in the outline 406. In response to the user input, the plug-in 802 operates in conjunction with the client program 105a to transmit a request to the productivity server 100 for the first section of the first document 114. The request includes the key name of the section, which the productivity server 100 uses to retrieve the first section from the database server 106. The productivity server 100 transmits the mark-up language block to the second computing device 104. The plug-in 802 renders the mark-up language block on the display of the second computing device 104, resulting in the view shown in FIG. 4 on the user interface 400.

Figure 8B:
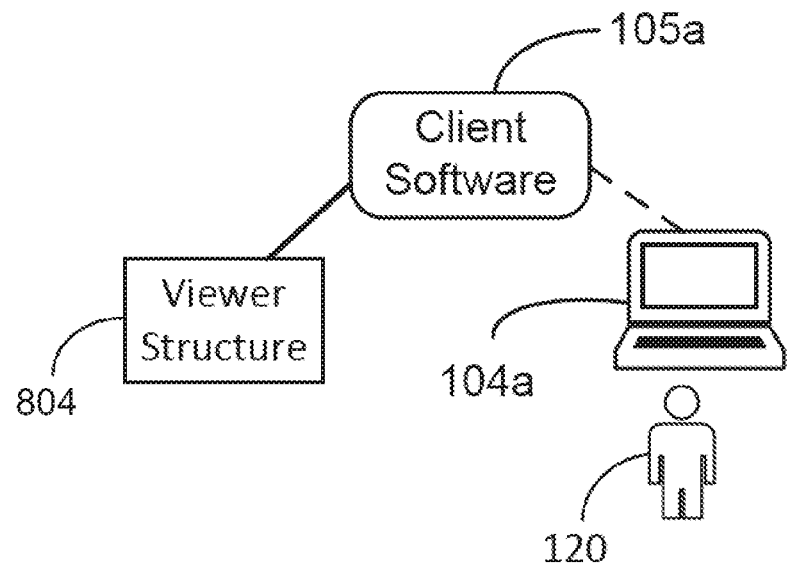

Turning to FIG. 8B, in another embodiment, the one or more of the computing devices 104a, 104b, and 104c communicates with the productivity server 100 through the client program 105a without the use of a plug-in program. In this embodiment, the client program 105a and the productivity server 100 communicate with one another using, for example, a scripting language such as JavaScript® in combination with HTTP requests and responses. For example, assume that the client program 105a receives an input from the first user 120, such as a mouse click on an icon representing the document 114. In response to the input, the second computing device 104a, under the control of the client program 105a, transmits a request for the first document 114 to the productivity server 100. The productivity server 100 then retrieves the multiple data items that constitute the first document 114 using direct references (e.g., calling up the entity by its key name from the database server 106) or indirect references (e.g., querying the database server 106 for all entities that have the key name of the document as a property). Entities that the productivity server 100 may retrieve include the various mark-up language blocks. The productivity server 100 then translates the mark-up language blocks into drawing commands (e.g., scalable vector graphics commands invoked by JavaScript®) and transmits those drawing commands to the client program 105a. The client program 105a renders the document 114 on the display 210 according to the drawing commands. Additionally, the productivity server 100 provides, to the client program 105a, a viewer structure 804. The viewer structure 804 is a data structure that maps coordinates on the user interface 400 (e.g., XY coordinates on the display 210) to the parts of the outline in the outline area 402 or identifiers (i.e., asset ids, such as table ids, paragraph ids, page ids, etc.) of user content in the user content area 404.

To illustrate, assume that the first user 120 interacts with the user interface 400 (which is being displayed by the client program 105a on the second computing device 104a) to request the first section of the first document 114. The first user 120 does this by left-clicking on the "Section 1" friendly name in the outline 406. In response to the user input, the client program 105a detects the coordinates of the location of the click and uses a viewer structure to determine the asset to be requested. The client program 105a then uses the viewer structure to map the section id of the asset to the key name of the appropriate database entity. The client program 105a transmits a request to the productivity server 100 for the asset having that key name. The productivity server 100 translates the mark-up language block into drawing commands and transmits the drawing commands to the client program 105a. The client program 105a renders the drawing commands on the display of the second computing device 104a, resulting in the view shown in FIG. 4A, FIG. 4B, and FIG. 4C on the user interface 400.

In a more specific example involving a comment, assume that the second computing device 104a uses the architecture shown in FIG. 8A. Further assume that (via the user interface 400) the first user 120 selects the word "itself" on the user interface 400 (e.g., via one of the user input devices 208 of the second computing device 104a), right-clicks, and selects "Add Comment" from a pop-up menu. The plug-in 802 detects the location on the user interface 400 (e.g., in terms of XY coordinates) and, identifies which asset of the document 114 is closest to the location. In this example, the selected text "itself" is closest to the second paragraph. The plug-in 802 also determines a character offset of the start of the selection and a character offset of the end of the selection. The plug-in 802 determines these offsets relative to the start of the paragraph. Thus, in this example, the start offset value is 50 and the end offset value is 56 (i.e., the number of characters, including spaces, from the start of the paragraph to the beginning of the selected text and to the end of the selected text). The plug-in 802 displays a comment box on the user interface 400 to allow the first user 120 to enter a comment. The first user 120 types in the comment which, in this example, is "I don't know about the last term," into the first comment box 432. The plug-in 802, in conjunction with the client program 105a, transmits the paragraph id of the second paragraph element, the offset value of the start of the selection and the offset value of the end of the selection to the productivity server 100 along with a request to create a comment thread.

Figure 4E:
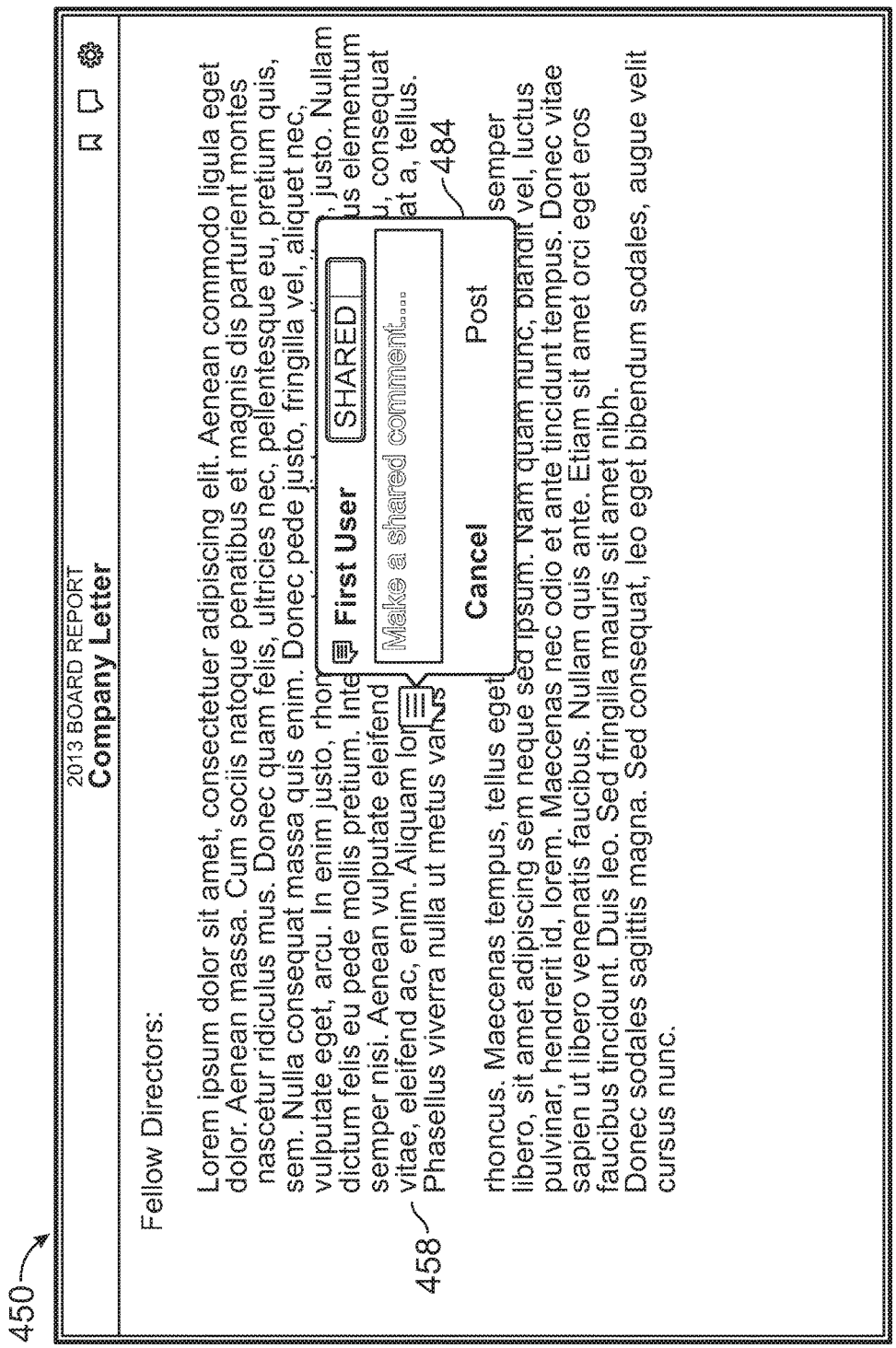
Figure 4H:
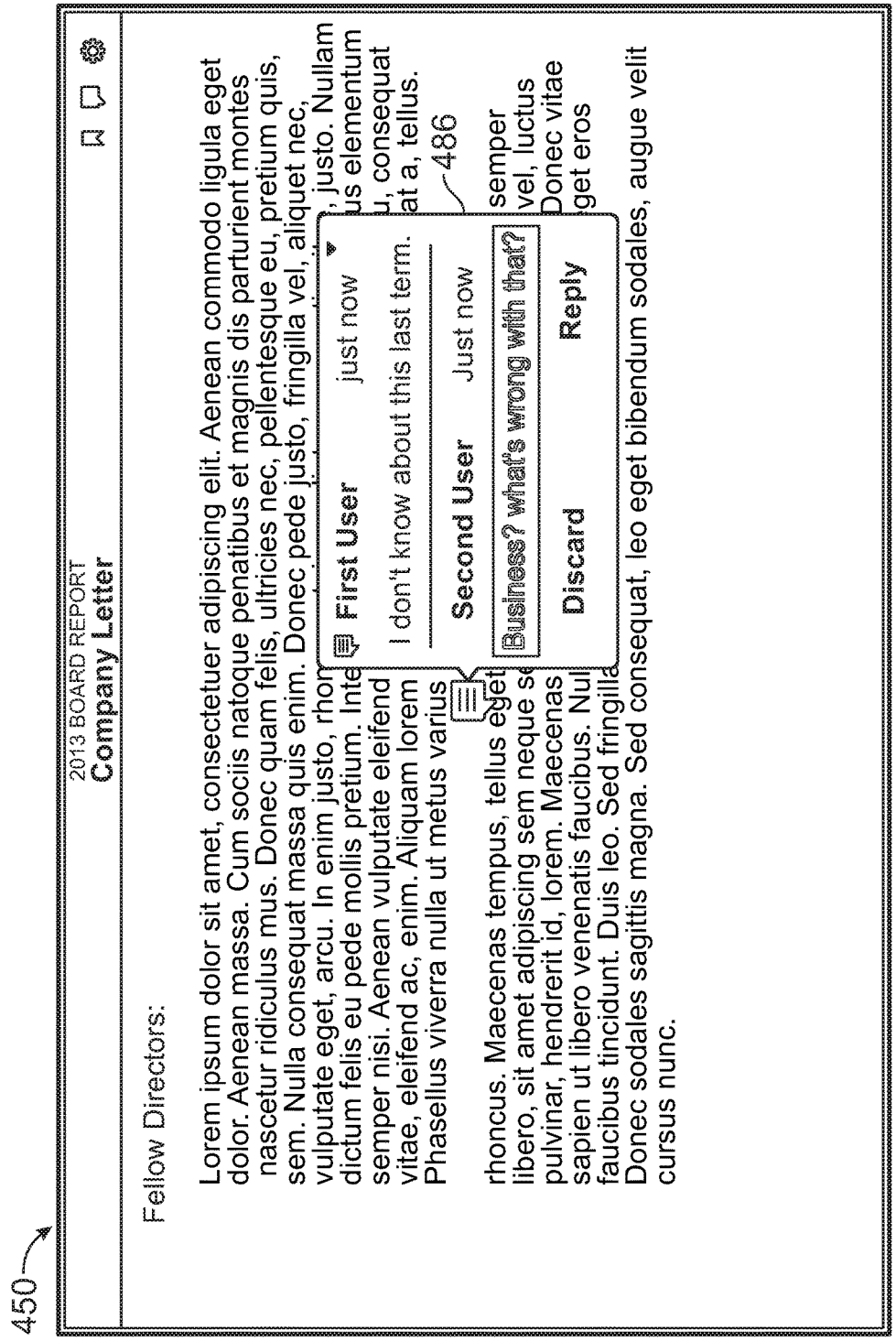

In another embodiment, assume that the second computing device 104a uses the architecture of FIG. 8B. Further assume that the first user 120 taps within the area of the display of the user interface 450 that contains the paragraph 458. The browser 105a detects the location on the user interface 450 (e.g., in terms of XY coordinates) and, using the viewer structure 804 (which, as noted above, maps the user interface or screen coordinates to asset identifiers), identifies which asset of the document 114 contains the location. In the viewer structure 804, the XY coordinate maps to the paragraph id of the paragraph 458. The client program 105a displays a first comment box 484 (FIG. 4E) on the user interface 450 to allow the first user 120 to enter a comment. Turning to FIG. 4E, the first user 120 types in the comment which, in this example, is "I don't know about this last term," into the first comment box 484. The browser 105a transmits the following to the productivity server 100: the key name of the entity currently being displayed and the paragraph id of the paragraph 458 (with which the comment is to be associated).

In response to the request from the computing device, the productivity server 100 instantiates (i.e., creates an instance of) the comment thread entity 708 and the first comment entity 710. The productivity server 100 stores (via the database server 106) a reference to the first comment entity 710 within the comment thread entity 708. The productivity server 100 also stores the text of the first user's comment within the first comment entity 710. In some embodiments, the productivity server stores a set of metadata representing the position for each comment thread in a support data entity (such as the document support data entity 706). Those positions get updated in response to changes to the document section.

The productivity server 100 is able to retrieve the comment thread entity 708 from the database server 106 by query, if need be. For example, if a user logs into the productivity server 100 and (via the user's computing device) requests a document (or section thereof), the productivity server submits a query to the database server 106 to retrieve all comment thread entities that contain (e.g., have, as one of its properties) the document id of the requested document and that contain (e.g., have, as one of its properties) the section id of the requested section.

Continuing the example, the respective browsers on the third computing device 104b and the fourth computing device 104c each make periodic requests to the productivity server 100 for any updates to the section being displayed. Once the productivity server 100 finishes instantiating and storing the first comment, the productivity server 100 transmits information regarding the first comment to both the third computing device 104b and the fourth computing device 104c. Each of the third and fourth computing devices displays an icon 486 representing the first user's comment on the user interface 450. The second user 122 chooses to reply to the comment and interacts with the user interface 450 by tapping the icon 486 on a touchscreen display. The user interface 450 then displays the second comment box 486 (FIG. 4G). The second user 122 types the second comment (shown as "Business? What's wrong with that?") into the second comment box 486 and taps the "Reply" button on the user interface 400. Assuming that the third computing device 104b is using the architecture of FIG. 8B, the client program 105a transmits a request to the productivity server 100 to add the comment to the comment thread 432. The request includes the text of the comment and a reference to the comment thread entity 708. In response, the productivity server 100 instantiates the second comment entity 712.

Figure 4I:
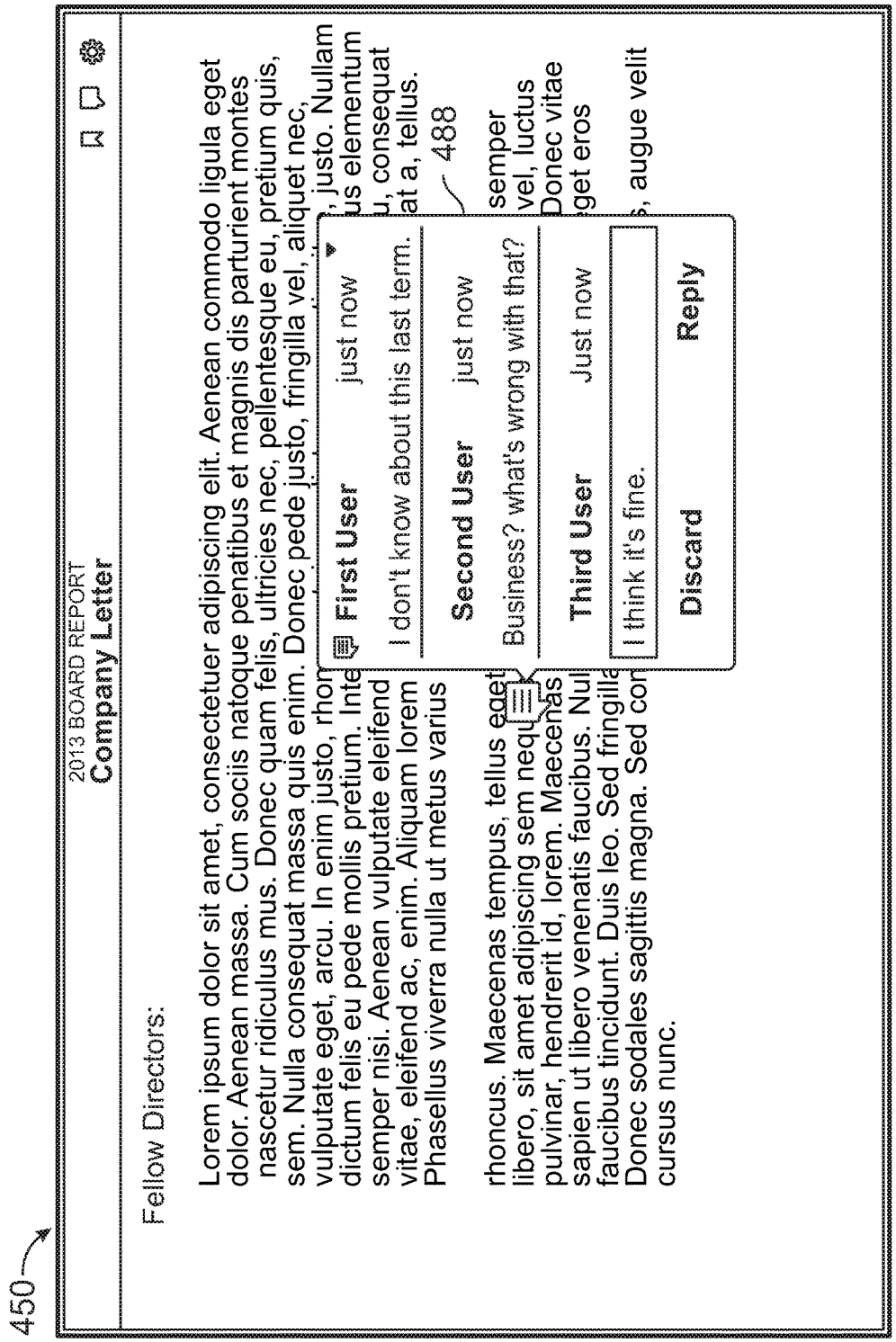

The third user 124 chooses to reply to the comment and interacts with the user interface 450 to indicate this. The user interface 450 then displays the third comment box 488 (FIG. 4I). The third user 124 types the third comment (shown as "I think it's fine.") into the third comment box 438 and taps the "Reply" button on the user interface 450. Assuming the architecture of FIG. 8B, the client program 105a transmits a request to the productivity server 100 to add the comment to the comment thread 432. The request includes the text of the comment and a reference to the comment thread entity 708. In response, the productivity server 100 instantiates the third comment entity 712.

In an embodiment, the comment thread 432 generated by the users of FIG. 1 follows the content to which it is associated (or anchored) even if a user moves the content. For example, assume that a user with editing rights to the first document 114 moves the second paragraph 430 from the first section to the second section (e.g., interacts with the user interface to cause the browser or plug-in to, in effect, send a request to the productivity server 100 to have the paragraph moved). Once the user shares the change, the productivity server 100 reacts by creating (e.g., requests that the database server 106 creates) a new document revision entity and a new document support data entity. The productivity server 100 puts a reference to the comment thread entity 708 (e.g., its key name) in the new document support data entity. Therefore, when a computing device (e.g., the second computing device 104a) requests the section containing the changes, the productivity server 100, in carrying out the process described previously for obtaining and delivering content to the computing device, is able to provide the comment thread 432 to the computing device without the need for having to make any actual change to the comment thread 432 itself.

To view an auxiliary document (in an embodiment), a user interacts with the client software (e.g., client software 105a), such as by performing a gesture (such as mouse clicking) on the entry representing the auxiliary document (e.g., clicking on "Exhibit 1"). In response, the client software sends the appropriate request to the productivity software 101, which responds by transmitting an update to the user interface of the client software (e.g., delivering a new web page to the browser running on the client computing device). After the update, the client software will display another version of the user interface.

To illustrate, assume that the first user 120 clicks the entry 522 of FIG. 5D. The productivity software 101 responds by transmitting the user interface depicted in FIG. 6A—user interface 600—to the client software 105a. The user interface 600 includes a display area 602 (depicted as a viewer pane) that is currently displaying Exhibit 1 (a document having text).

Figure 6A:
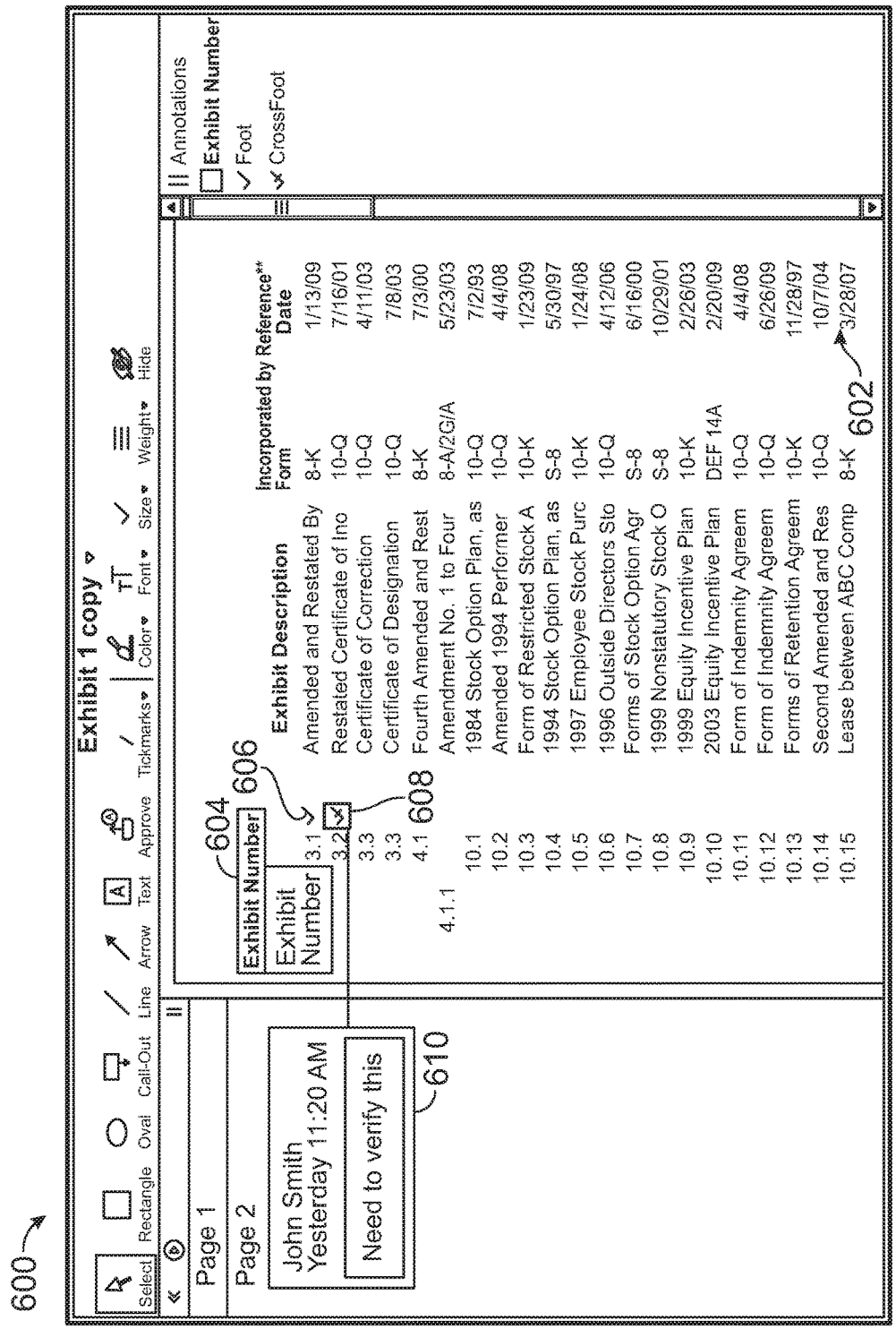

According to an embodiment, the first computing device 100 (under the control of the productivity software 101) can, in response to a user request, associate a given comment or comment thread with a graphical annotation. Ways in which this can be accomplished include anchoring the comment or comment thread to: (a) the display coordinates (e.g., the XY coordinates) of the graphical annotation, (b) the underlying content (e.g., paragraph) to which the graphical annotation is anchored, or (c) the graphical annotation itself. Referring to FIG. 6A, for example, a reviewer (John Smith) has inserted a comment in a comment box 610. The comment box 610 is shown as being connected to the graphical annotation 608 (the subject of the comment).

In addition to providing for comments and graphical annotations (including comments anchored to graphical annotations), the computing device 100 (in an embodiment) allows for the input of directed comments—comments that are directed to a user or group of users. In response to the input, the computing device 100 transmits one or more messages (e.g., email messages) to such users or groups of users.

Figure 6B:
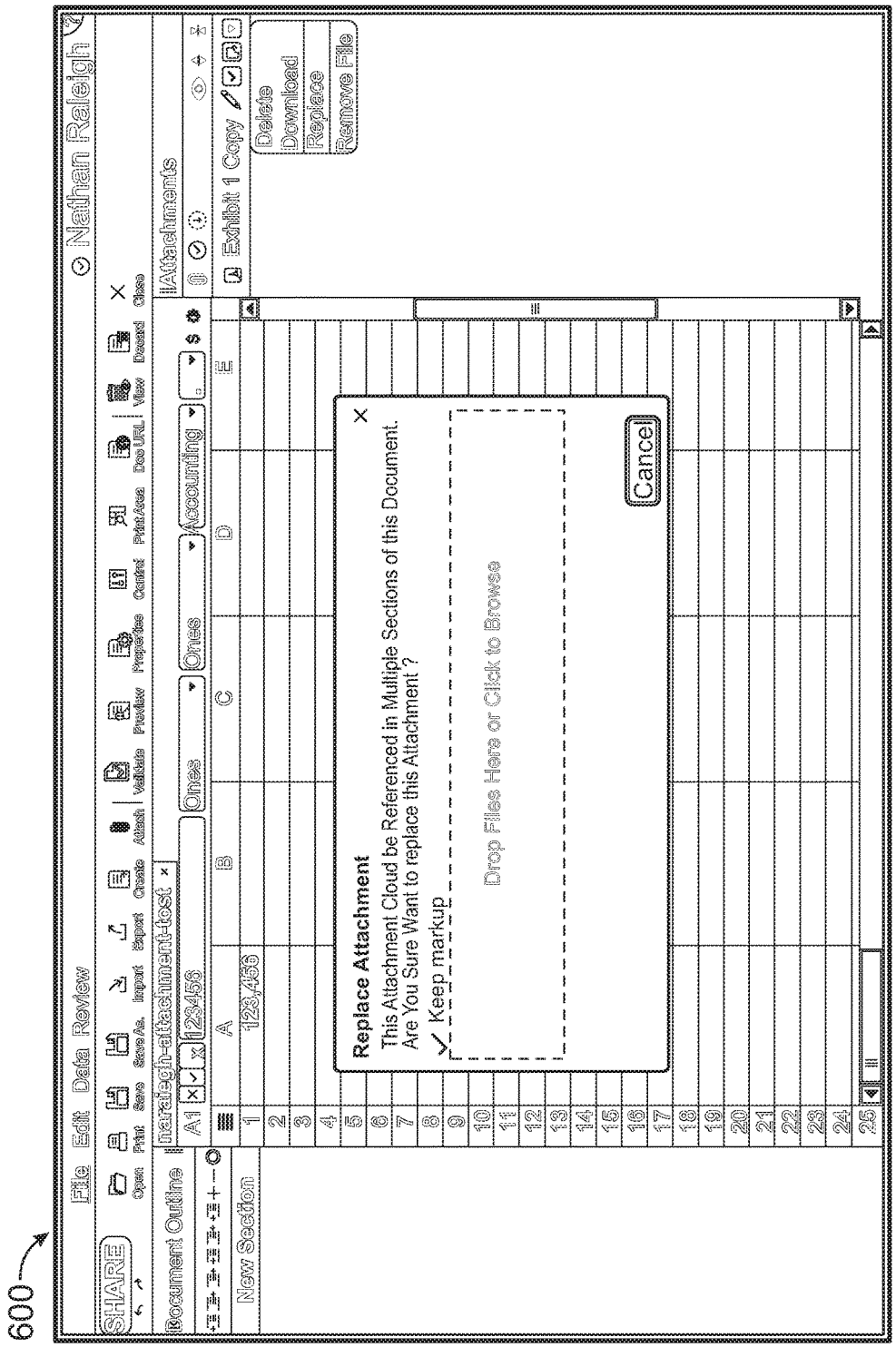
Figure 6E:
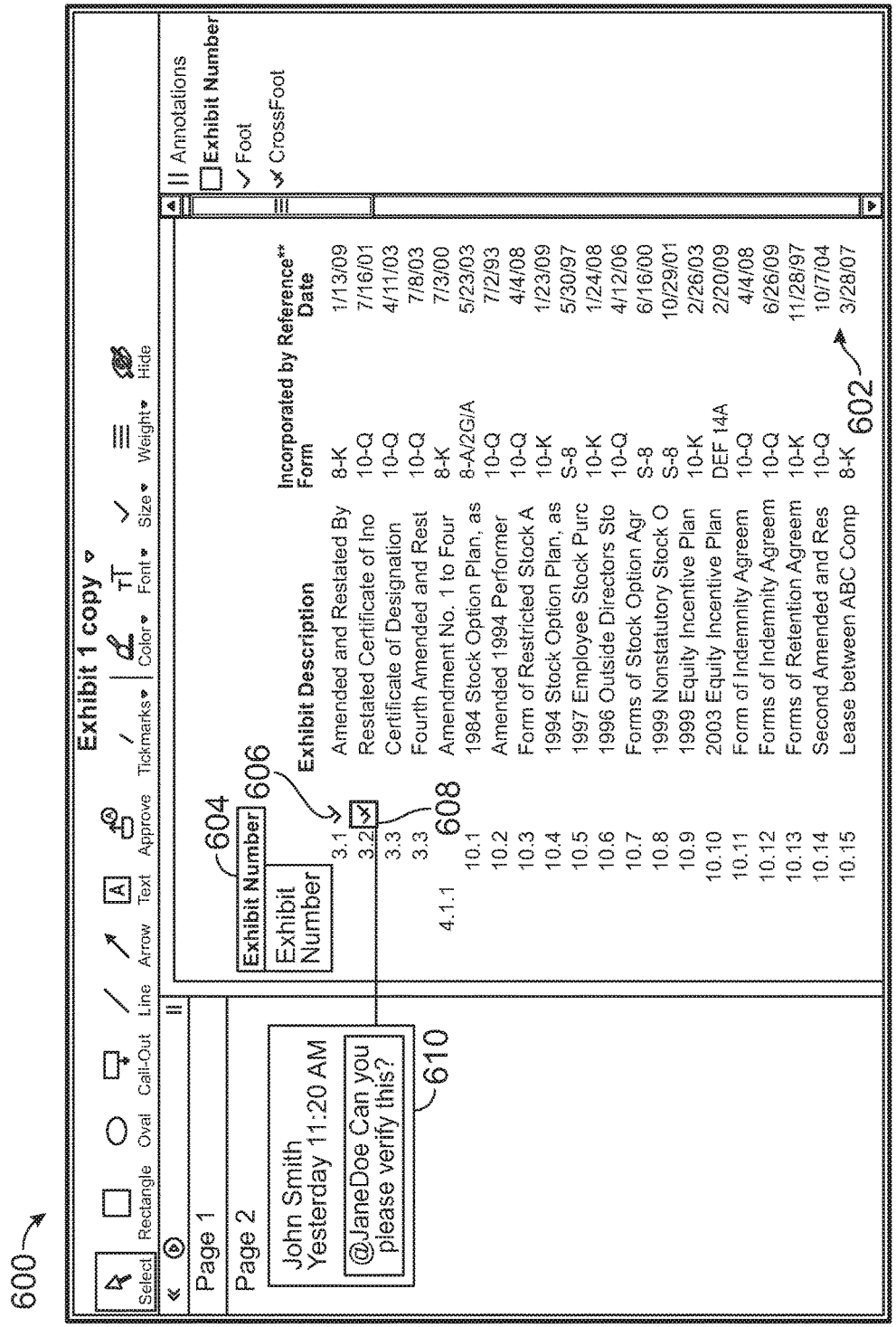

For example, FIG. 6E depicts a directed comment (in a comment box 612), which the first user 120 (user Mary Smith in this example) has triggered by including an "@" symbol after the comment. This action prompts the client software (e.g., the client software 105a) to display a list of users of the productivity software 101. The in this embodiment, the client software has a mapping of user names and group names to user IDs and group IDs (e.g., received previously from the productivity software 101). The first user 120 selects the second user 122 (user Jane Doe) from the list. In response to the first user 120 selecting "Post," the client software 105a transmits a message (e.g., a REST-compliant HTTP message) to the productivity software 101. The message includes Jane Doe's user ID and the text of the comment.

The first computing device 100 responds by carrying out the actions discussed above with regard to creating the comment thread entity 708 and the first comment entity 710. Additionally, the first computing device 100 instantiates the mentions entity 716 (if it does not already exist) and associates the mentions entity 716 with the first comment entity 710 within the database 108a (e.g., by inserting a reference to the mentions entity in the first comment entity 710 or vice versa) and adds Jane Doe's user ID to the mentions entity 716. The first computing device 100 transmits a message regarding the comment to the second user 122 (e.g., by generating and sending an email to Jane Doe or by adding a message to a dashboard (e.g., a task list) that Jane Doe logs into). In this scenario, for example, the first user 120 is the tester for a test of controls procedure and needs to consult the second user 122 to make sure that the "tick and tie" operation is properly carried out. Thus, for example, Mary Smith (the tester) makes the comment "Can you please verify this?" on the graphical annotation 608 and, by using the "@" symbol, cause the first computing device 100 to send an email to Jane Doe with a link to the attachment shown in FIG. 6D. Jane Doe could then respond with a further comment or even a directed comment (as part of a comment thread).

If, instead of a directed comment to Jane Doe, the first user 120 enters a comment that is directed to a group of users (e.g., "@finance"), the client software 105a carries out the same actions as described above for an individual user except that it sends the group ID to the productivity server 100 instead of the user ID. The productivity server 100 responds by instantiating the group mentions entity 718 (if it does not already exist), associating the group mentions entity 718 with the first comment entity 710 within the database 108a, and adding the finance group ID to the group mentions entity 718.

In an embodiment, a computing device (such as the first computing device 100) can replace a first version of an auxiliary document with a second version of the auxiliary document and roll forward the annotations from the first to the second version. One possible implementation of this technique will now be described. Referring back to FIG. 5D, assume that the first user 120 (using the appropriate input gestures in the user interface 500) indicates that the first version of the auxiliary document (represented in FIG. 1 by the document 132 and in FIG. 5D by the entry 522) is to be replaced with a second version (represented in FIG. 1 by the document 134). The client software 105a responds by displaying a dialog box (FIG. 6B), which asks whether the user wants to keep the same markup (i.e., the same annotations). If the first user 120 indicates that the same annotations are to be used, then the client software 105a transmits data signifying this selection to the productivity software 101. The productivity software 101 responds by creating an association between the data structure 130 and the second version 134 of the auxiliary document. If using the data entity structure shown in FIG. 7, the productivity software 101 could, for example, create an association between the first graphical annotation entity 722 (which, in this example, contains the data regarding the annotation 606) and the second document revision entity 720 as well as an association between the second graphical annotation entity 724 and the second document revision entity 720.

Turning to FIG. 6C, the client software 105a loads the second version of the auxiliary document (the second version of Exhibit 1 in this case) into the display area 602. As can be seen in FIG. 6C, the second version of the auxiliary document has basically the same layout and content as the first version of the auxiliary document, except that the lines have shifted vertically. Consequently, the lines having the text "Amended and Restated by 8-K" and "Restated Certificate of Inc. 10-Q" (which were annotated in FIG. 6A) are no longer in their original locations, but have moved to a second location lower on the page. As a result, the annotations 606 and 608 are in the wrong position. The position of the annotation 604 relative to the rest of the document has also moved, but the annotation 604 is not as sensitive to changes of position as the other annotations To correct this discrepancy (according to an embodiment), a user may interact with the user interface 600 to move the annotations 606 and 608 from the first location to the second location (e.g., using standard selection, drag, and drop gestures). The client software 105a transmits information regarding this change to the first computing device 100, which responds by updating the data structure 130 to reflect the new location of the annotations. In other words, the productivity software 101 updates the location data stored in the data structure 130. If using the data entity structure shown in FIG. 7, the productivity software 101 could update the first graphical annotation data entity 722 and the second graphical annotation data entity 724 and the second document revision entity 720 (e.g., with the new XY coordinate or with the new asset ID and/or character offset).

In an embodiment, the first computing device 100 also maintains, in a read-only manner, the annotations of the document being replaced. For example, the first computing device 100 may "burn" the annotation graphics into document being replaced using a non-editable PDF format.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims.

What is claimed is:

1. A method for processing comments and graphical annotations on a document, the method comprising:
   a first computing device transmitting instructions for rendering a document to a second computing device via a computer network;
   in response to the instructions, the second computing device
      rendering the document on a display device as view-only;
      defining a transparent drawing canvas over the rendered document
   the second computing device receiving a user input indicating: a coordinate on the rendered document, a graphical annotation, and text for the graphical annotation;
   the second computing device drawing the graphical annotation and placing the text on the drawing canvas anchored at the coordinate;

the second computing device mapping the coordinate to a portion of the document underneath the drawing canvas to which the text and the graphical annotation are to be anchored;

the second computing device transmitting, to the first computing device, an identifier of the portion of the document, a request for the graphical annotation to be anchored to the portion of the document, and a request for the text to be associated with the graphical annotation;

the first computing device using the identifier to determine a database entity containing the portion of the document the first computing device storing the graphical annotation in a database in a graphical annotation entity of the database;

the first computing device creating, within the database, an association between the entity containing the portion of the document and the graphical annotation entity;

the first computing device storing the text in the database in a comment entity; and the first computing device creating an association between the graphical annotation entity and the comment entity within the database.

2. The method of claim 1, further comprising:
the first computing device retrieving the graphical annotation entity from the database; and
the first computing device visually rendering the graphical annotation at a location on a display indicated by location data in the graphical annotation entity.

3. The method of claim 2, wherein
the graphical annotation entity is a scripting data structure, and
visually rendering the graphical annotation comprises the first computing device
converting contents of the scripting data structure into drawing instructions, and
transmitting the drawing instructions to the second computing device.

4. The method of claim 1, further comprising:
the first computing device determining that the received comment is directed to a user or to a group of users; and
the first computing device sending a message regarding the comment to the user or group of users.

5. The method of claim 4, wherein the message includes a link to a portion of the document to which the graphical annotation is anchored.

6. The method of claim 1, wherein associating the graphical annotation entity with the comment entity comprises including a reference to the comment entity within the graphical annotation entity or including a reference to the graphical annotation entity within the comment entity.

7. The method of claim 1, further comprising the first computing device:
receiving an input of a second comment for the graphical annotation;
instantiating, in the database, a entity for a comment thread; and
in the database, associating the comment thread with both the comment and the second comment.

8. The method of claim 1, further comprising the first computing device including, in the graphical annotation entity, location data that indicates the location at which the graphical annotation is to be displayed.

9. The method of claim 8, wherein the location data comprises the coordinates at which the graphical annotation is to be displayed.

10. The method of claim 8, wherein the location data comprises the portion of the document that contains content to which the graphical annotation is to be anchored.

11. The method of claim 1, further comprising the first computing device including, in the graphical annotation entity, graphics data that indicates the graphics to be used to render the graphical annotation.

12. A method for maintaining graphical annotations, the method comprising:
a first computing device transmitting instructions for rendering a first version of a document to a second computing device via a computer network;
in response to the instructions, the second computing device
rendering the first version of the document on a display device as view-only;
defining a transparent drawing canvas over the rendered document
the second computing device receiving, via the user interface, a user input indicating: a coordinate on the first version of the document, a graphical annotation, and text for the graphical annotation;
the second computing device drawing the graphical annotation on the drawing canvas anchored at the coordinate;
the second computing device mapping the coordinate to a portion of the document underneath the drawing canvas to which the text and the graphical annotation are to be anchored;
the second computing device transmitting, to the first computing device, an identifier of the portion of the document and a request for the graphical annotation to be anchored to the portion of the document
the first computing device using the identifier to determine a database entity containing the portion of the document
the first computing device storing the graphical annotation in a graphical annotation entity in a database separately from the document;
the first computing device storing the identifier in the database;
the first computing device creating, within the database, an association between the entity containing the portion of the document and the graphical annotation entity;
the first computing device storing the text in the database in a comment entity;
the first computing device creating an association between the graphical annotation entity and the comment entity within the database;
the first computing device receiving a request for the first version of the document to be replaced by a second version of the document;
the first computing device retrieving the graphical annotation and the identifier from the database;
the first computing device transmitting the graphical annotation and the identifier to the second computing device;
the second computing device displaying the second version of the document in the display area of the user interface;
the second computing device determining, based on the retrieved identifier, a location on the second version of the document at which to display the graphical annotation; and
the second computing device displaying the retrieved graphical annotation on the second version of the document at the determined location.

13. The method of claim 12, wherein the identifier identifies a paragraph within the document, the method further comprising:
- the first computing device storing, in the database, a character offset that indicates a number of characters from the beginning of the identified paragraph;
- the first computing device retrieving the character offset from the database; and
- the second computing device determining, based on the retrieved character offset, a location within the paragraph at which to anchor the graphical annotation.

14. The method of claim 12, further comprising:
- in response to a user input, the second computing device moving the graphical annotation to a second location; and
- the first computing device updating the identifier in the database in accordance with the second location.

15. The method of claim 14, wherein:
- the graphical annotation is one of a plurality of graphical annotations being displayed; and
- the user input includes a selection of one or more, but not all, of the plurality of annotations.

16. The method of claim 12, further comprising:
- the second computing device receiving a user request to replace the first version of the document with the second version of the document; and
- the second computing device receiving an indication from the user that the graphical annotation is to be maintained for the second version of the auxiliary document,
- wherein retrieving the graphical annotation and the identifier from the database is carried out in response to the received indication.

* * * * *